(12) United States Patent
Camden et al.

(10) Patent No.: US 9,742,580 B2
(45) Date of Patent: *Aug. 22, 2017

(54) WIRELESS CONTROL DEVICE

(71) Applicant: Lutron Electronics Co., Inc., Coopersburg, PA (US)

(72) Inventors: Richard S. Camden, Coopersburg, PA (US); Donald R. Mosebrook, Coopersburg, PA (US); William Taylor Shivell, Breinigsville, PA (US); Amy E. Miller, Allentown, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,952

(22) Filed: Jan. 6, 2017

(65) Prior Publication Data

US 2017/0126422 A1 May 4, 2017

Related U.S. Application Data

(63) Continuation of application No. 14/724,542, filed on May 28, 2015, now Pat. No. 9,578,720.
(Continued)

(51) Int. Cl.
*H04L 12/28* (2006.01)
*G08C 17/02* (2006.01)
(Continued)

(52) U.S. Cl.
CPC .......... *H04L 12/2816* (2013.01); *G05B 15/02* (2013.01); *G08C 17/02* (2013.01);
(Continued)

(58) Field of Classification Search
CPC ...... H05B 37/02; H04L 12/2816; H01Q 1/22; H01Q 1/24; H01Q 1/1221; H01Q 13/10;
(Continued)

(56) References Cited

U.S. PATENT DOCUMENTS 4,130,822 A 12/1978 Conroy
4,864,588 A 9/1989 Simpson et al.
(Continued)

*Primary Examiner* — Ali Neyzari
(74) *Attorney, Agent, or Firm* — Condo Roccia Koptiw LLP

(57) ABSTRACT

A wall-mountable wireless control device may include an antenna (e.g., a slot antenna or a hybrid slot-patch antenna) for transmitting and/or receiving radio-frequency signals. The wireless control device may comprise a user interface, an antenna, a radio-frequency communication circuit, a control circuit, and/or a conductive faceplate. The radio-frequency communication circuit may be configured to transmit or receive radio-frequency signals via the antenna. The user interface may be configured to receive a user input. The conductive faceplate may be configured to operate as a radiating element of the antenna when the conductive faceplate is mounted to the wireless control device and the user interface is received in the opening of the conductive faceplate. The conductive faceplate may comprise a conductive material arranged over a plastic carrier, for example, the conductive material may be provided adjacent to greater than or equal to approximately 85% of the front surface.

21 Claims, 30 Drawing Sheets

Related U.S. Application Data

(60) Provisional application No. 62/076,786, filed on Nov. 7, 2014, provisional application No. 62/005,424, filed on May 30, 2014.

(51) Int. Cl.
  *H01Q 1/22* (2006.01)
  *H01Q 1/12* (2006.01)
  *G05B 15/02* (2006.01)
  *H01Q 13/10* (2006.01)
  *H04W 4/00* (2009.01)
  *H01Q 1/24* (2006.01)

(52) U.S. Cl.
  CPC ............ *H01Q 1/1221* (2013.01); *H01Q 1/22* (2013.01); *H01Q 13/10* (2013.01); *H04W 4/008* (2013.01); *H01Q 1/24* (2013.01)

(58) Field of Classification Search
  CPC ... G05B 15/02; H04W 4/008; G08C 2201/30; G08C 17/02
  USPC ........................................................ 340/12.5
  See application file for complete search history.

(56) References Cited

U.S. PATENT DOCUMENTS

| | | |
|---|---|---|
| 4,932,037 A | 6/1990 | Simpson et al. |
| 4,995,053 A | 2/1991 | Simpson et al. |
| 5,239,205 A | 8/1993 | Hoffman et al. |
| 5,340,954 A | 8/1994 | Hoffman et al. |
| 5,736,965 A | 4/1998 | Mosebrook et al. |
| 5,818,128 A | 10/1998 | Hoffman et al. |
| 5,905,442 A | 5/1999 | Mosebrook et al. |
| 5,982,103 A | 11/1999 | Mosebrook et al. |
| 6,266,538 B1 | 7/2001 | Waldron |
| 6,677,909 B2 | 1/2004 | Sun et al. |
| 6,891,284 B2 | 5/2005 | Tilley |
| 7,106,261 B2 | 9/2006 | Nagel et al. |
| 7,242,150 B2 | 7/2007 | DeJonge et al. |
| 7,358,927 B2 | 4/2008 | Luebke et al. |
| 7,362,285 B2 | 4/2008 | Webb et al. |
| 7,408,525 B2 | 8/2008 | Webb et al. |
| 7,546,473 B2 | 6/2009 | Newman |
| 7,548,216 B2 | 6/2009 | Webb et al. |
| 7,573,436 B2 | 8/2009 | Webb et al. |
| 7,592,967 B2 | 9/2009 | Mosebrook et al. |
| 7,714,790 B1 | 5/2010 | Feldstein et al. |
| 7,756,556 B2 | 7/2010 | Patel et al. |
| 7,834,817 B2 | 11/2010 | Mosebrook et al. |
| 8,009,042 B2 | 8/2011 | Steiner et al. |
| 8,173,920 B2 | 5/2012 | Altonen et al. |
| 8,199,010 B2 | 6/2012 | Sloan et al. |
| 8,228,184 B2 | 7/2012 | Blakeley et al. |
| 8,248,919 B2 | 8/2012 | Shi et al. |
| 8,330,638 B2 | 12/2012 | Altonen et al. |
| 8,664,881 B2 | 3/2014 | Newman, Jr. et al. |
| 8,754,816 B2 | 6/2014 | Feldstein et al. |
| 8,950,460 B2 | 2/2015 | Worthman et al. |
| 9,277,629 B2 | 3/2016 | Steiner et al. |
| 9,386,666 B2 | 7/2016 | Economy |
| 2009/0184652 A1 | 7/2009 | Bollinger, Jr. et al. |
| 2014/0132475 A1 | 5/2014 | Bhutani et al. |
| 2015/0349402 A1* | 12/2015 | Camden ................. H01Q 13/10 343/702 |
| 2015/0349427 A1 | 12/2015 | Camden et al. |
| 2015/0349973 A1* | 12/2015 | Camden ................. H01Q 13/10 340/12.5 |

* cited by examiner

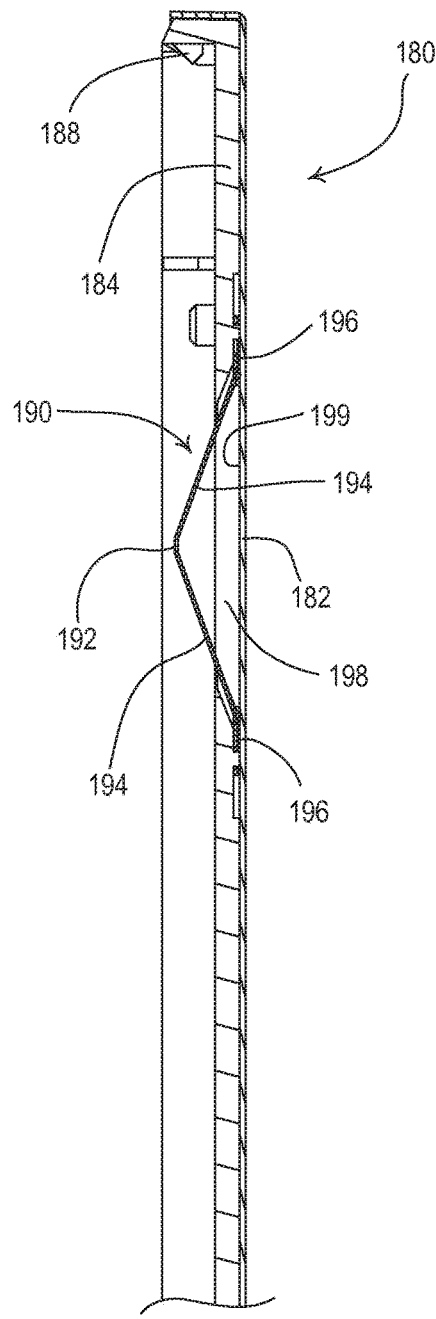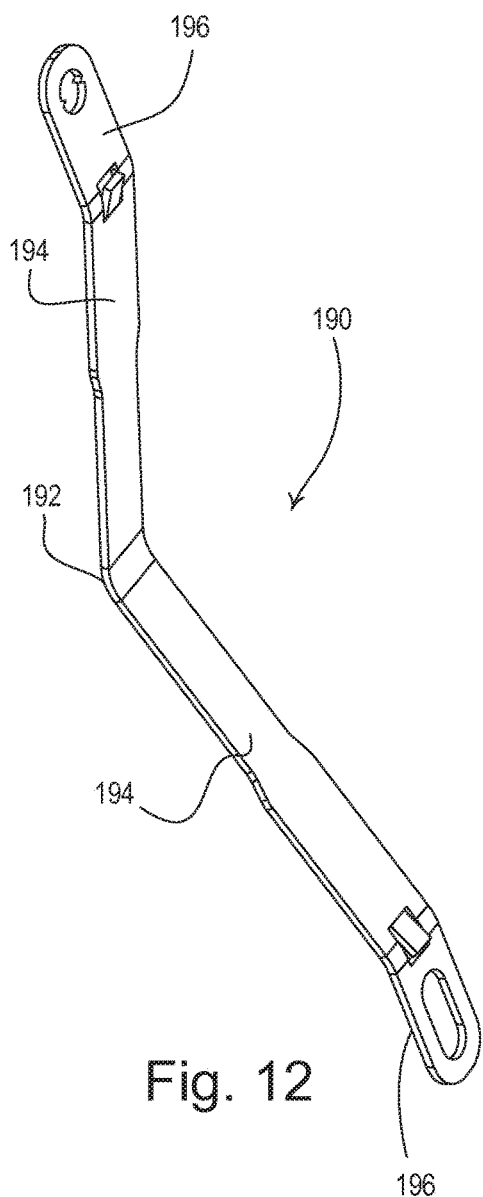
Fig. 11
Fig. 12

WIRELESS CONTROL DEVICE

CROSS-REFERENCE TO RELATED APPLICATIONS

This application is a continuation of U.S. Non-Provisional application Ser. No. 14/724,542, filed on May 28, 2015 which claims the benefit of U.S. Provisional Application No. 62/076,786 filed on Nov. 7, 2014, and U.S. Provisional Application No. 62/005,424 filed on May 30, 2014, which are incorporated by referenced herein in their entirety.

BACKGROUND

Home automation systems, which have become increasing popular, may be used by homeowners to integrate and control multiple electrical and/or electronic devices in their house. For example, a homeowner may connect appliances, lights, blinds, thermostats, cable or satellite boxes, security systems, telecommunication systems, or the like to each other via a wireless network. The homeowner may control these devices using a controller or user interface provided via a phone, a tablet, a computer, and the like directly connected to the network or remotely connected via the Internet. These devices may communicate with each other and the controller to, for example, improve their efficiency, their convenience, and/or their usability.

A wall-mounted load control device may be adapted to be mounted in a standard electrical wallbox. For example, a wall-mounted dimmer switch may be coupled in series electrical connection between an alternating-current (AC) power source and an electrical load (e.g., a lighting load) for controlling the power delivered from the AC power source to the lighting load and thus the intensity of the lighting load. Many prior art wall-mounted load control devices are capable of transmitting and/or receiving wireless signals (e.g., radio-frequency (RF) signals) with other control devices in a load control system. For example, a wireless load control device may be configured to receive digital messages via the RF signals for controlling the electrical load and to transmit digital messages including feedback information regarding the status of the load control device and/or the electrical load. Such wall-mounted wireless load control devices have included antennas for transmitting and/or receiving the RF signals. Examples of antennas for prior-art wall-mounted load control devices are described in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The components and/or building structure surrounding the location at which a wall-mounted wireless load control device is installed may affect the communication range (e.g., the transmission and/or reception range) of the control device. For example, the control device may be mounted in an electrical wallbox, and the electrical wallbox may be made of a conductive material (e.g., a metal) or a non-conductive material (e.g., a plastic). In addition, a faceplate may be mounted to the load control device, and a part or the entirety of the faceplate may be made of a conductive material (e.g., a metal) or a non-conductive material (e.g., a plastic). When the wall-mounted wireless load control device is installed in a metal wallbox or with a faceplate assembly made of metal, electric fields that are produced when the antenna is transmitting an RF signal may cause current to flow through the metal wallbox and/or through the metal faceplate assembly, which in turn may affect the transmission and/or reception range of the antenna.

The possible differences in the materials surrounding the installation location of the wall-mounted wireless load control device may cause the communication range of the load control device to vary from one installation to another. However, it is desirable to have a consistent communication range and performance of the wall-mounted wireless load control device from one installation location to the next.

In addition, if the faceplate assembly mounted to the wireless load control device includes a large amount of metallization on the front (or outer) surface of the faceplate, the communication range of the wireless load control device may be diminished to a point that the wireless load control device may not able to communicate with the other RF-enabled components of the load control system. Since conductive faceplates typically provide an attractive aesthetic appearance, it is desirable to install conductive faceplates on wall-mounted wireless load control devices. Therefore, there is a need for a wall-mounted wireless load control device that is able to operate properly while installed with a conductive faceplate.

SUMMARY

As described herein, a wall-mountable wireless control device may include an antenna for transmitting and/or receiving radio-frequency signals. The wireless control device may comprise a user interface, an antenna, a radio-frequency communication circuit, a control circuit, and/or a conductive faceplate. The antenna may be configured to transmit and/or receive radio-frequency signals. The radio-frequency communication circuit may be configured to transmit and/or receive the radio-frequency signals via the antenna. The control circuit may be responsive to the radio-frequency communication circuit. The user interface may be configured to receive a user input. The conductive faceplate may be configured to operate as a radiating element of the antenna, for example, when the conductive faceplate is mounted to the wireless control device and the user interface is received in the opening of the conductive faceplate.

The conductive faceplate may comprise a conductive material arranged over a plastic carrier. For example, the conductive material may be provided adjacent to greater than or equal to approximately 85% of a front surface of the conductive faceplate. The conductive faceplate may comprises a conductive backer attached to a rear surface of the plastic carrier. The conductive backer may be electrically coupled to the yoke via a single electrical connection when the conductive faceplate is mounted to the wireless control device. The conductive faceplate may be electrically coupled to a yoke of the wireless control device via a single electrical connection when the conductive faceplate is mounted to the wireless control device. The conductive faceplate may be configured to operate as a patch antenna when the conductive faceplate is electrically coupled to the yoke via a single electrical connection.

The antenna may be a slot antenna. The slot antenna may comprise a driven element, which may be located inside of the wireless control device and may have a first elongated slot through which the actuation member of the user interface extends. The first slot may be substantially the same size as and substantially aligned with the opening of the faceplate. The driven element may operate as a radiating element of the slot antenna. When a faceplate having a conductive element is installed on the wireless control device, the conductive element may operate as the radiating element of the slot antenna. The conductive element of the faceplate may comprise a second elongated slot substantially the same size as and substantially aligned with the first slot of the driven element (e.g., and thus with the opening of the faceplate). The conductive element of the faceplate may operate as a patch antenna (i.e., the wireless control device may have a hybrid slot-patch antenna). For example, the conductive element of the faceplate may be coupled to the yoke through a single electrical coupling, such that the conductive element operates as a patch antenna.

The wall-mountable wireless control device may be installed in multi-gang installations. For example, a multi-gang wireless control system may comprise a plurality of wireless control devices mounted in a multi-gang electrical wallbox and a multi-gang conductive faceplate. Each wireless control device may comprise a yoke configured to mount the control device to the multi-gang electrical wallbox, a user interface configured to receive a user input, an antenna for transmitting and/or receiving radio-frequency signals, and a control circuit responsive to the user input and the radio-frequency signals received by the antenna. The multi-gang conductive faceplate may have a plurality of openings for receiving the respective user interfaces of the wireless control devices. The conductive faceplate may include a single conductive material that operates as a radiating element for the antennas of the wireless control devices. The yoke of at least one of the control devices may be coupled to the single conductive material through a single electrical coupling. For example, the yoke of each of the control devices may be coupled to the single conductive material through a respective single electrical connection, where the single electrical connections are located at the same location on each of the load control devices or at different locations on the load control devices.

Other features and advantages of the present disclosure will become apparent from the following description that refers to the accompanying drawings.

BRIEF DESCRIPTION OF THE DRAWINGS

FIG. 11 is a partial right side cross-sectional view of the conductive faceplate of FIG. 9.

FIG. 12 is an enlarged perspective view of a conductive spring element of the conductive faceplate of FIG. 9.

DETAILED DESCRIPTION

Figure 1:
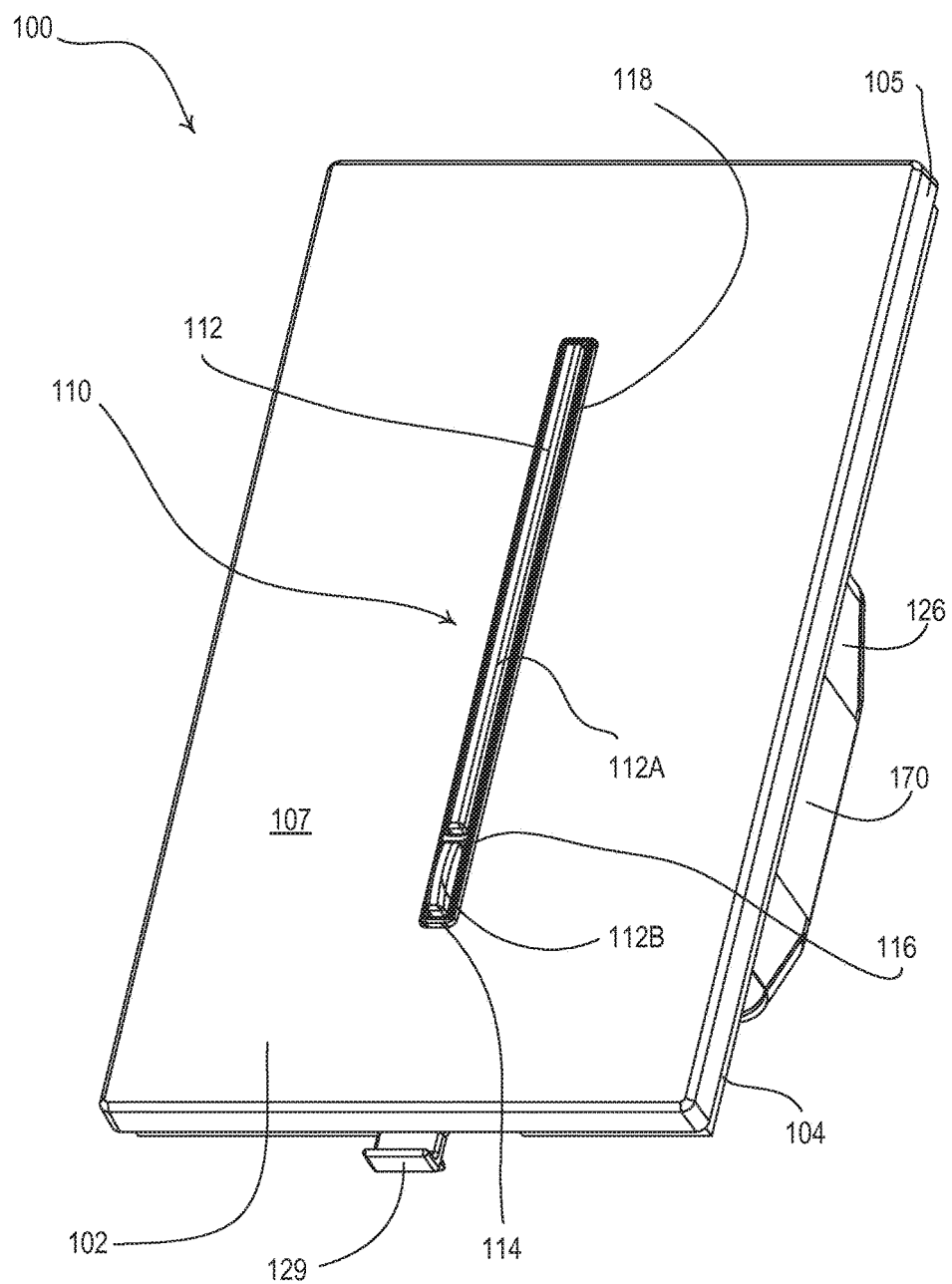
FIG. 1 is a perspective view of an example wall-mounted load control device (e.g., a dimmer switch) having a thin touch sensitive actuator.
Figure 2:
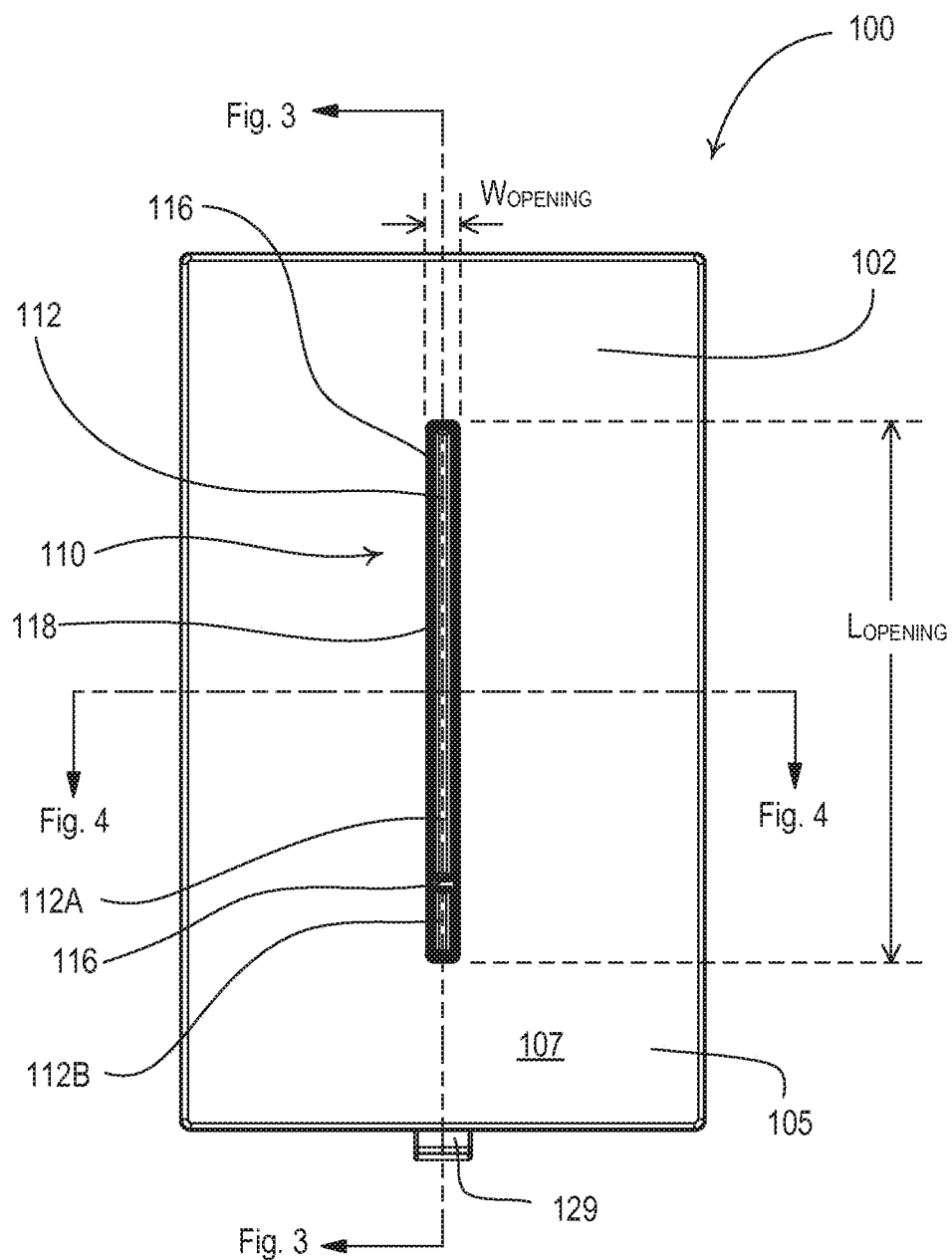
FIG. 2 is a front view of the load control device of FIG. 1.
Figure 3:
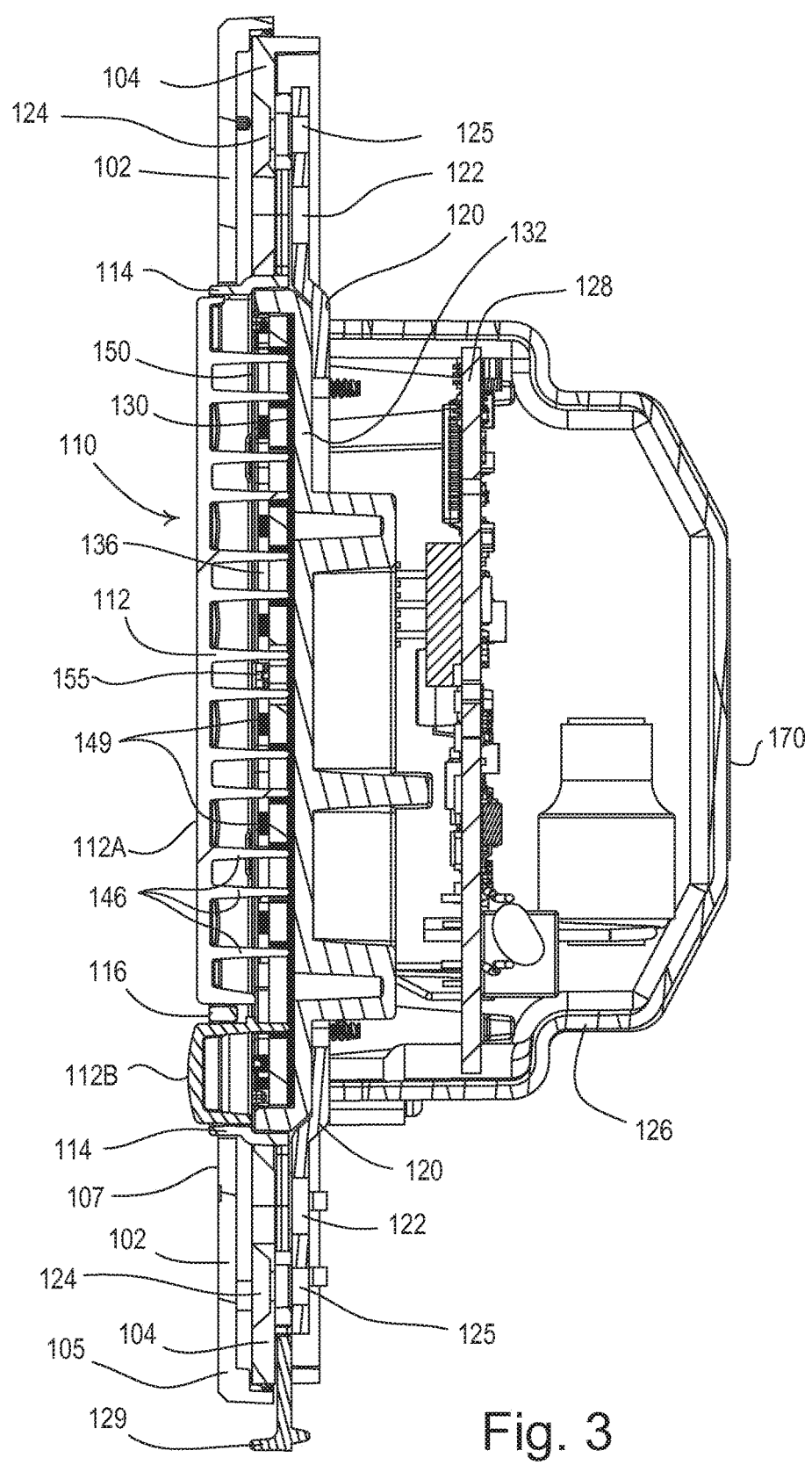
FIG. 3 is a right side cross-sectional view of the load control device of FIG. 1 taken through the center of the load control device as shown in FIG. 2.
Figure 4:
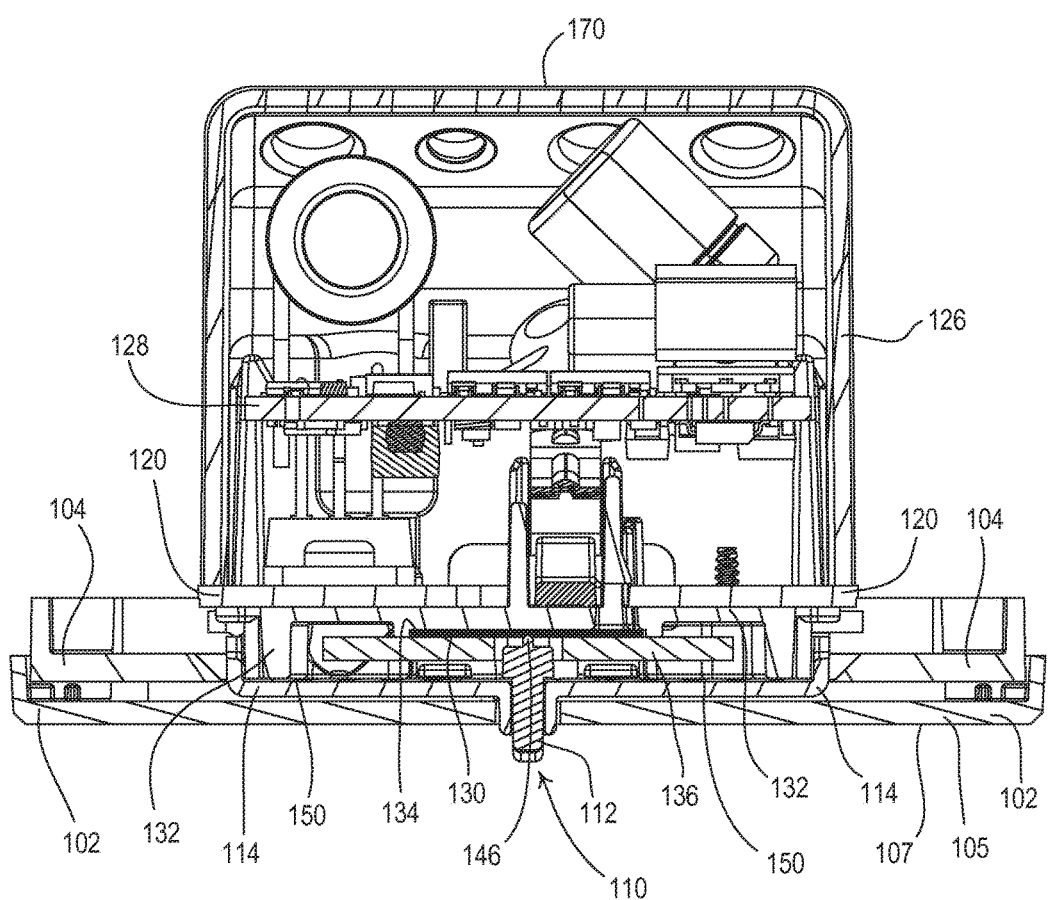
FIG. 4 is a top side cross-sectional view of the load control device of FIG. 1 taken through the center of the load control device as shown in FIG. 2.
Figure 5:
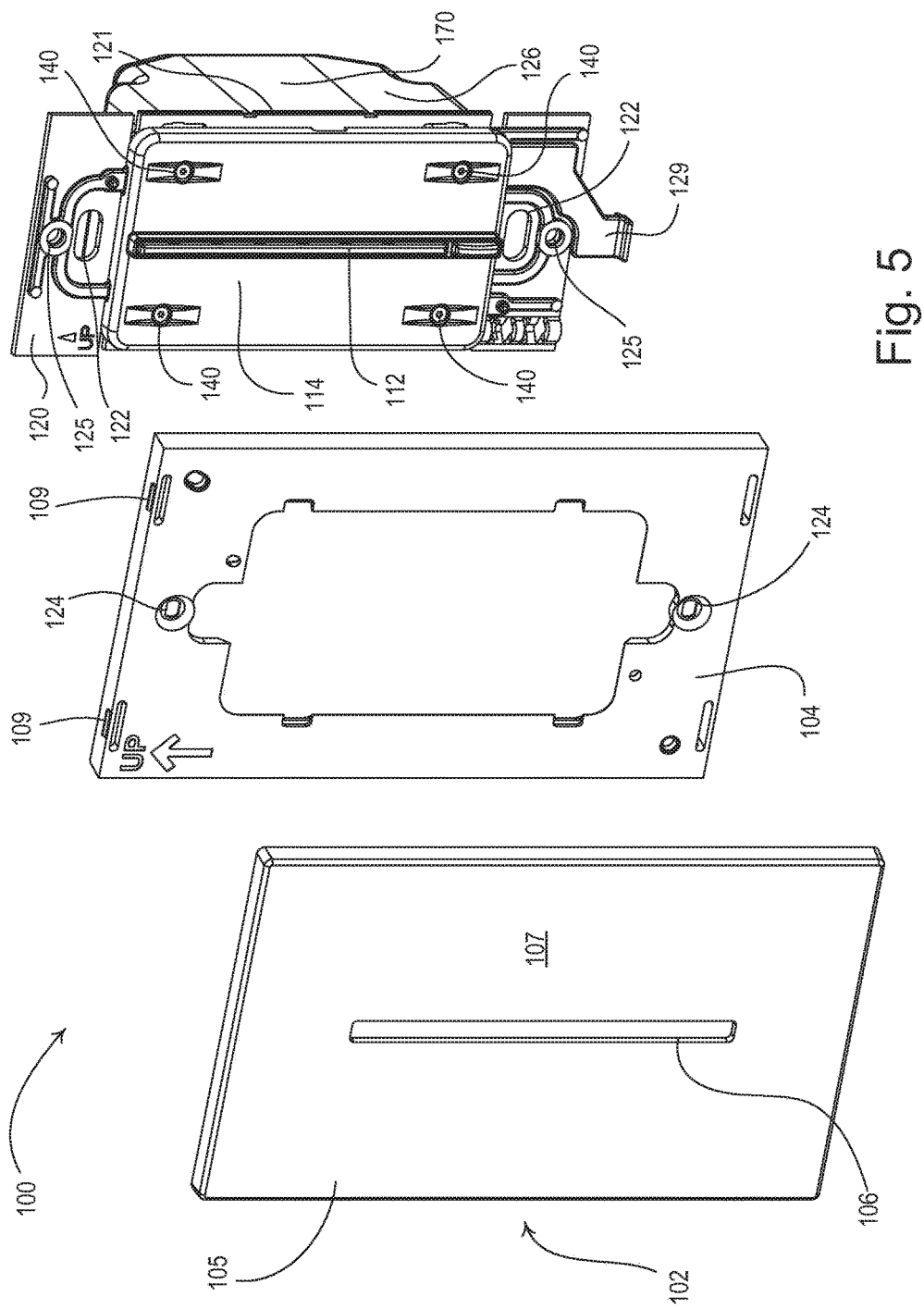
FIG. 5 is a partial exploded view of the load control device of FIG. 1 showing a faceplate and an adapter plate removed from the load control device.
Figure 6:
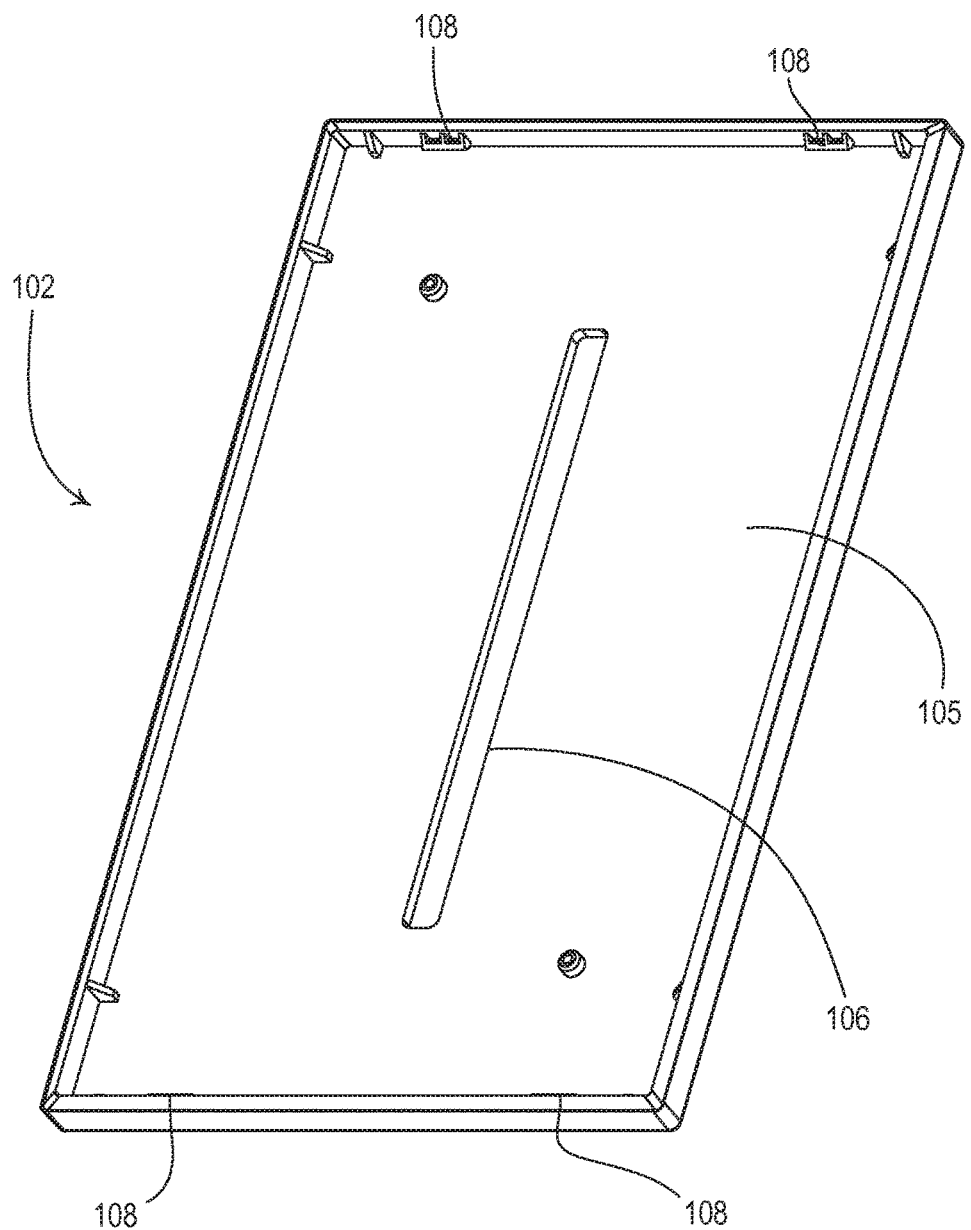
FIG. 6 is a rear perspective view of the faceplate of FIG. 5.
Figure 7:
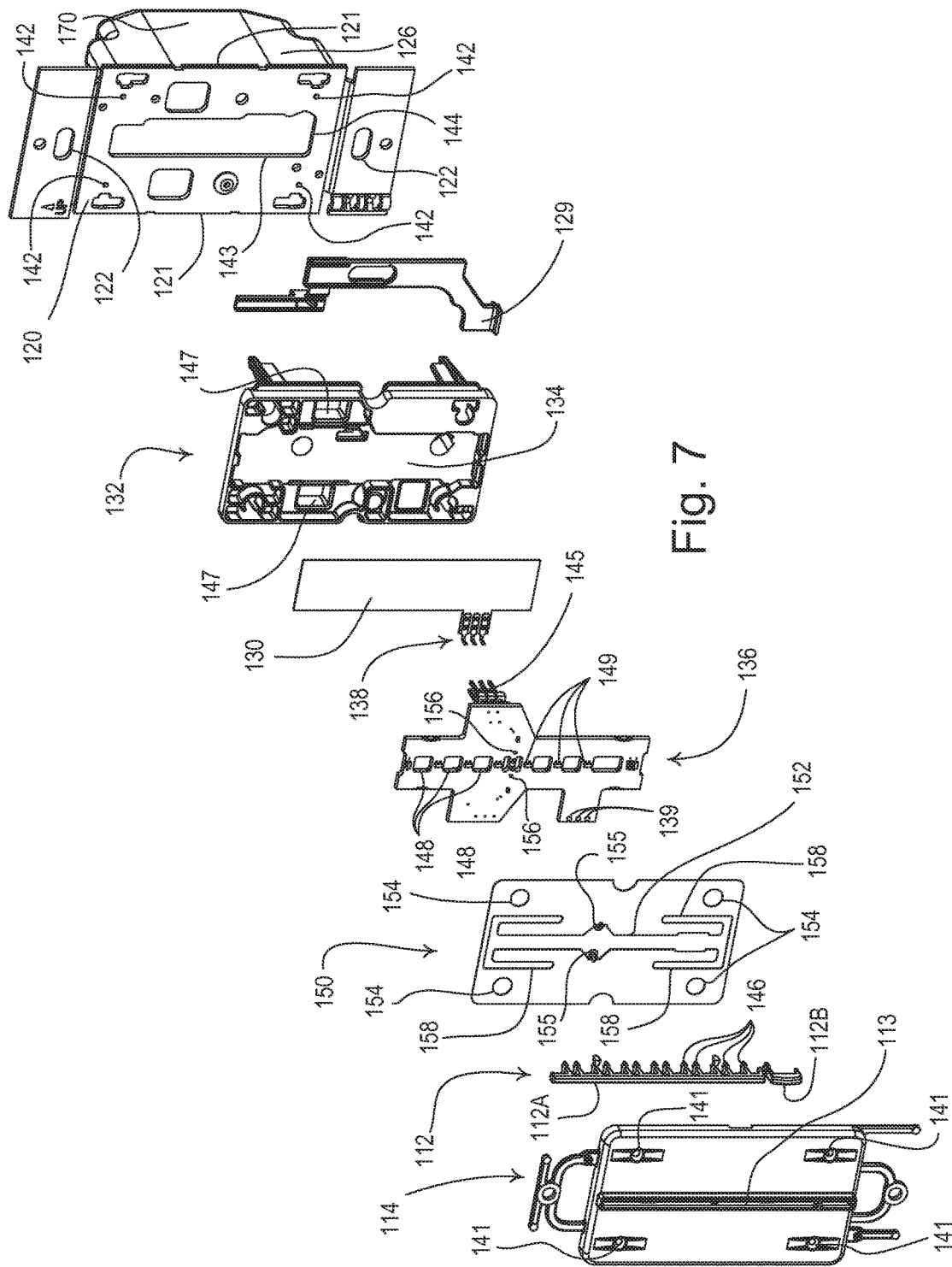
FIG. 7 is an exploded view of the load control device of FIG. 1 showing a portion of an antenna of the load control device.

FIG. 1 is a perspective view and FIG. 2 is a front view of an example wall-mounted load control device 100 (e.g., a dimmer switch). The load control device 100 may be used for controlling the power delivered from an alternating-current (AC) source to an electrical load (e.g., a lighting load). FIG. 3 is a right side cross-sectional view of the load control device 100 taken through the center of the load control device as shown in FIG. 2. FIG. 4 is a top side cross-sectional view of the load control device 100 taken through the center of the load control device as shown in FIG. 2. FIG. 5 is a partial exploded view of the load control device 100 showing a faceplate 102 and an adapter plate 104 removed from the load control device. FIG. 6 is a rear perspective view of the faceplate 102. FIG. 7 is an exploded view of the load control device 100 showing a portion of an antenna of the load control device.

The load control device 100 may include a touch sensitive actuator 110. The touch sensitive actuator may be horizontally oriented along a longitudinal axis of the load control device 100. The faceplate 102 may have a body portion 105. The body portion 105 may define a front surface 107 of the faceplate 102. The faceplate 102 may include a non-standard opening 106 in the front surface 107 of the body portion 105. The opening 106 may be adapted to receive the touch sensitive actuator 110, for example, when the faceplate 102 is installed on the load control device 100. The opening 106 may have a length $L_{OPENING}$. The opening may have a width $W_{OPENING}$. The opening 106 may have an aspect ratio (e.g., $L_{OPENING}:W_{OPENING}$) of approximately 16:1. For example, the length $L_{OPENING}$ may be approximately 2.83 inches and the width $W_{OPENING}$ may be approximately 0.17 inches. The body portion 105 of the faceplate 102 may be made from, for example, a non-conductive material, such as plastic. The body portion 105 of the faceplate 102 may be made from a conductive material, such as metal, for example. The body portion may be made of a non-conductive material and the front surface 107 may include a conductive material (e.g., a metallic material), for example as described herein.

The touch sensitive actuator 110 may include an actuation member 112. The actuation member 112 may include first and second portions 112A, 112B. The load control device 100 may include a bezel 114. The bezel 114 may be shaped to form an opening 113. The actuation member 112 may extend through the opening 113 in the bezel 114 to contact a touch sensitive device 130 (e.g., a resistive touch pad) inside the load control device 100. The touch sensitive device 130 may be referred to as a user interface that a user may interact with, for example, in order to control a lighting load. The load control device 100 may be operable to control the intensity of the controlled lighting load in response to actuations of the actuation member 112 and/or the touch sensitive device 130. The bezel 114 may include a break 116 that may separate the upper portion 112A and the lower portion 112B of the actuation member 112. The load control device 100 may be configured to toggle a connected lighting load from on to off and vice versa, for example, upon actuation of the lower portion 112B of the actuation member 112. The load control device 100 may be configured to adjust an intensity of the lighting load, for example, based on actuation(s) of the upper portion 112A of the actuation member 112. The load control device 100 may adjust the intensity of the lighting load to a particular level based on the position of the actuation along the length of the actuation member 112.

The load control device 100 may include a yoke 120. The yoke 120 may be used to mount the load control device 100 to a standard electrical wallbox, for example, via mounting screws (not shown) that may be received through two mounting holes 122. The yoke 120 may be made from a conductive material. The faceplate 102 may be mounted (e.g., snapped) to the adapter plate 104, for example, such that the bezel 114 is housed behind the faceplate 102 and the bezel 114 extends through the opening 106. For example, tabs 108 on the top and bottom sides of the faceplate 102 may be adapted to snap to tabs 109 on the top and bottom edges of the adapter plate 104. The adapter plate 104 may connect to the yoke 120 of the load control device 100, for example, via faceplate screws (not shown) that may be received through openings 124 in the adapter plate 104 and corresponding openings 125 in the yoke 120. The load control device 100 may include an enclosure 126 (e.g., a back box). The enclosure 126 may house a rear printed circuit board (PCB) 128. A portion of the electrical circuitry of the load control device 100 may be mounted on the rear PCB 128. An air-gap actuator 129 may allow for actuation of an internal air-gap switch (not shown) to electrically disconnect the electrical load from the AC power source, for example, by pulling the air-gap actuator down.

The load control device 100 may include a non-conductive cradle 132. The cradle 132 may be shaped to form a recess 134. The recess 134 may be used to hold the touch sensitive device 130. The touch sensitive device 130 may be electrically coupled to a front printed circuit board (PCB) 136, for example, via connector pins 138 that may be received in through-holes 139 in the front PCB 136. The bezel 114 may attach to the yoke 120, for example, such that the cradle 132 and the front PCB 136 are positioned (e.g., captured) between the bezel 114 and the yoke 120. For example, the bezel 114 may attach to the cradle 132 via screws 140 (e.g., electrically conductive screws) that may be received through openings 141 in the bezel 114 and corresponding openings 142 in the yoke 120. The air-gap actuator 129 may be positioned between the cradle and the yoke 120 and is configured to actuate the internal air-gap switch inside of the enclosure 126 through a central opening 144 in the yoke 120. The air-gap switch actuator 129 may be configured to translate along the longitudinal axis of the load control device 100 to open and close the internal air-gap switch. The front PCB 136 may be connected to the rear PCB 128, for example, via two electrical connectors 145 that may extend through openings 147 in the cradle 132.

The actuation member 112 may be positioned (e.g., captured) between the bezel 114 and the touch sensitive device 130, for example, in the recess 134 of the cradle 132, such that the front surface of the actuation member 112 may extend through the opening 113 in the bezel 114. The actuation member 112 may include actuation posts 146 that may contact the front surface of the touch sensitive device 130. The posts 146 may be arranged in a linear array along the length of the actuation member (e.g., along the longitudinal axis of the load control device 100). The actuation posts 146 may act as force concentrators to concentrate the force from an actuation of the front surface of the actuation member 112 to the touch sensitive device 130. The front PCB 136 may be shaped to form holes 148. The actuation posts 146 may extend through the holes 148 in the front PCB 136 to contact the touch sensitive device 130. An example of a load control device having a thin touch sensitive actuator is described in greater detail in commonly-assigned U.S. Pat. No. 7,791,595, issued Sep. 7, 2010, entitled TOUCH SCREEN ASSEMBLY FOR A LIGHTING CONTROL, the entire disclosure of which is hereby incorporated by reference.

The front PCB 136 may include visual indicators, for example, light-emitting diodes (LEDs) 149, that may be arranged in a linear array adjacent to a rear surface of the actuation member 112. The actuation member 112 may be substantially transparent, for example, such that the LEDs 149 are operable to illuminate portions of the front surface of the actuation member 112. Two different color LEDs 149 may be positioned behind the lower portion 112B of the actuator member 112. For example, the lower portion 112B may be illuminated with blue light when the lighting load is on and the lower portion 112B may be illuminated with orange light when the lighting load is off. The LEDs 149 behind the upper portion 112A of the actuation member 112 may be blue and may be illuminated, for example, as a bar graph to display the intensity of the lighting load when the lighting load is on. The operation of the LEDs 149 is described in greater detail in U.S. Pat. No. 7,592,925, issued Sep. 22, 2009, entitled LIGHTING CONTROL HAVING AN IDLE STATE WITH WAKE-UP UPON ACTUATION, the entire disclosure of which is hereby incorporated by reference.

The load control device 100 may include an antenna (e.g., a slot antenna). The antenna may comprise a driven element 150, and for example, may be said to include one or more other elements. For example, the antenna may comprise any combination of the driven element 150, a conductive member (e.g., a conductive member 170), the yoke 120, one or more conductive elements (e.g., a conductive faceplate and/or a conductive backer, as described herein), and/or the like. The antenna may include a wireless communication circuit 160. The driven element 150 may be coupled to the wireless communication circuit 160. For example, the wireless communication circuit 160 may drive the driven element 150 of the antenna. The wireless communication circuit 160 may be used for transmitting and/or receiving radio-frequency (RF) signals, for example, via the antenna. The wireless communication circuit 160 may communicate RF signals at a communication frequency $f_{RF}$ (e.g., approximately 434 MHz). For example, the wireless communication circuit 160 may include an RF receiver, an RF transmitter, and/or an RF transceiver. The wireless communication circuit 160 may be mounted to the rear PCB 128 inside the enclosure 126.

The driven element 150 may be formed of a conductive material (e.g., an electrically-conductive material). The driven element 150 may be substantially planar. For example, the drive element 150 may be substantially planar except for feet 155, for example, as shown in FIG. 7. The driven element 150 may be located between the bezel 114 and the front PCB 136. The drive element 150 may be adapted to be attached to a rear surface of the bezel 114. For example, the drive element 150 may be printed or painted on the rear surface of the bezel 114. The driven element 150 may be a conductive label that adheres to the rear surface of the bezel 114. The driven element 150 may include a main slot 152. The main slot 152 may extend along the longitudinal axis of the load control device 100. The main slot 152 may be approximately the same size as the opening 118 in the faceplate 102 through which the bezel 114 extends. When the faceplate 102 is connected to the load control device 100, the main slot 152 is aligned with the opening 118 of the faceplate 102. The actuation posts 146 of the actuation member 112 extend through the main slot 152 to the touch sensitive device 130. The driven element 150 may form openings 154. The screws 140 that attach the bezel 114 to the yoke 120 may extend through the openings 154, such that the screws 140 may not be electrically coupled to the driven element 150.

The driven element 150 may include the feet 155 (e.g., drive points) that may be electrically connected to pads 156 on the front PCB 136 to allow for electrical connection to the wireless communication circuit 160 on the rear PCB 128 through the connectors 145. The feet 155 may be located on opposite sides of the main slot 152. The feet 155 may be located at approximately the middle of the main slot, as exemplified in FIG. 7. The wireless communication circuit 160 may be configured to drive the feet 154 differentially, such that the driven element 150 operates as a slot antenna and radiates the RF signals. The driven element 150 may operate as a radiating element of the load control device 100.

One or more elements of the antenna may act as a radiating element of the antenna. A radiating element may be any element that radiates a signal (e.g., a RF signal). For example, one or more of the driven element 150, the conductive member (e.g., a conductive member 170), the yoke 120, and/or one or more of the conductive elements (e.g., the conductive faceplate and/or the conductive backer) may act as a radiating element of the antenna. One of the radiating elements may be referred to as an outer-most radiating element. The outer-most radiating element may be the structure that interfaces with the broadcasting medium (e.g., ambient air, for example, the air that is immediately surrounding the load control device 100). For example, the driven element 150 and/or one of the conductive elements (e.g., the conductive faceplate and/or the conductive backer) may operate as the outer-most radiating element. The driven element 150 may operate as the outer-most radiating element of the load control device 100 when, for example, the faceplate 102 is not installed on the load control device 100 or a non-conductive (e.g., 100% plastic) faceplate is installed on the load control device 100.

The length and/or width of the main slot 152 of the driven element 150 may determine the inductance of the driven element 150. The resonant frequency of the antenna may be a function of the inductance of the driven elements 150. The resonant frequency of the antenna may be a function of the dimensions (e.g., length and/or width) of the main slot 152. A communication range (e.g., a transmission range and/or reception range) of the antenna at the communication frequency $f_{RF}$ of the wireless communication circuit 160 may depend on the length and/or width of the main slot 152. The overall size of the driven element 150 and the dimension of the main slot 152 may be limited by the size of the mechanical structures of the load control device 100 (e.g., the bezel 114). At some communication frequencies (e.g., around 434 MHz), the desired length of the main slot 152 to maximize the communication range of the antenna may be longer than length of bezel 114. The driven element 150 may include wrap-around slot portions 158 to increase the inductance of the driven element 150. The wrap-around portions 158 may extend from the ends of the main slot 152. The wrap-around portions 158 may be oriented substantially parallel to the main slot 152. The length of the main slot 152 and the wrap-around slot portions 158 may depend upon the communication frequency $f_{RF}$ of the wireless communication circuit 160. The wrap-around slot portion 158 may be formed of other shapes, such as, for example, spiral shapes.

At higher communication frequencies (e.g., around 2.4 GHz), the desired length of the main slot 152 to maximize the communication range of the antenna may be shorter. Accordingly, the driven element 150 may not include the wrap-around slot portions 158. The length of the main slot 152 may be shortened. The antenna of the load control device 100 may include a dual resonant structure having two resonant frequencies, such that the load control device 100 is able to communicate at two different communication frequencies (e.g., approximately 434 MHz and 868 MHz).

The load control device 100 may be mounted to a metal and/or plastic wallbox. One or more components of the faceplate assembly (e.g., the faceplate 102 and/or the adapter plate 104) may be made of a conductive material (e.g., a metal) and/or a non-conductive material (e.g., plastic). The load control device 100 may be configured such that an impedance of the antenna, and the communication range (e.g., a transmission and/or reception range) of the antenna at the communication frequency $f_{RF}$ may be substantially consistent over various installation conditions. The antenna may cause an electric field to be generated, for example, when the antenna is transmitting. When the load control device 100 is installed in a metal wallbox, the electric field may cause current to flow through the metal wallbox and affect the communication range of the antenna at the communication frequency $f_{RF}$.

Figure 8:
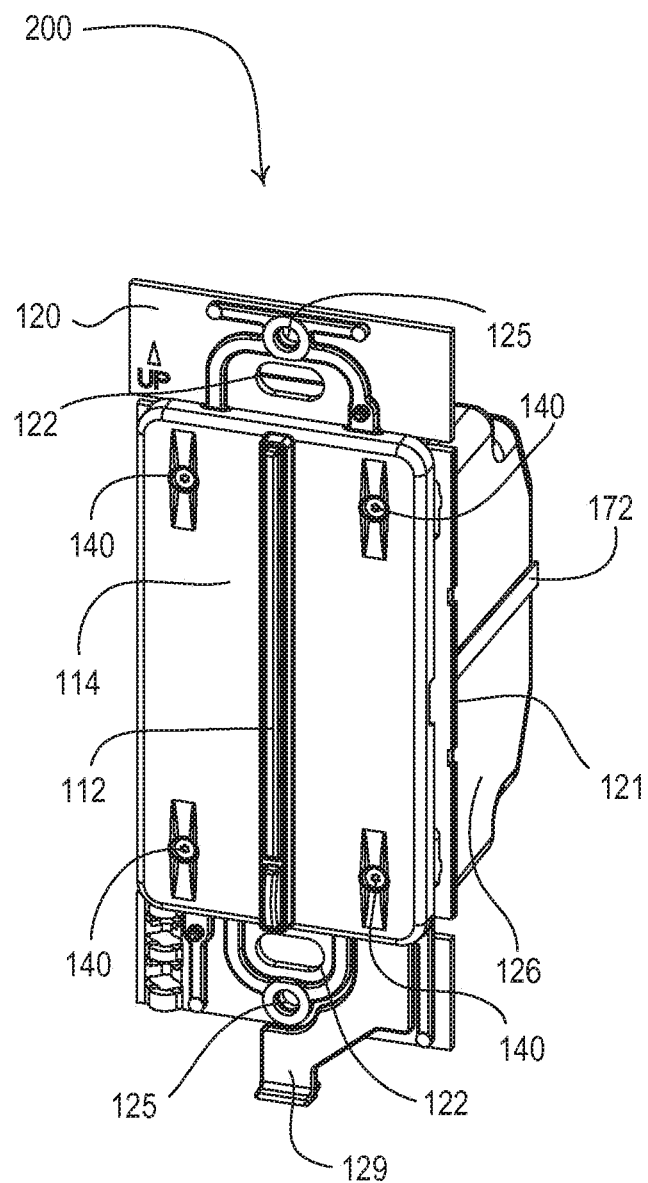
FIG. 8 is a perspective view of another example wall-mounted load control device having a thin touch sensitive actuator.

The load control device 100 may include a conductive member 170. The conductive member 170 may be a conductive label, such as a metal label. The conductive member 170 may wrap around the back of the enclosure 126 between points on opposite sides 121 of the yoke 120. For example, the conductive member 170 may wrap around the back of the enclosure 126 between opposites sides of the central opening 143 and adjacent the feet 155 of the driven element 150. In other words, the conductive member 170 may extend horizontally around the back of the enclosure 126 at the center of the yoke 120. The conductive member 170 may be directly connected or capacitively coupled to the opposite sides 121 of the yoke 120. For example, the conductive member 170 may be screwed to the yoke 120 via one or more conductive screws. The conductive member 170 may include a conductive coating, a conductive paint, a conductive label, and/or a conductive strap 172, for example, as illustrated in FIG. 8. The strap 172 may be made of a conductive material, such as metal. The strap 172 may be strapped onto the load control device 100 around the back side of the enclosure 126 extending from both sides 121 of the yoke 120. The enclosure 126 may be a metalized enclosure made of a conductive material or infused with a conductive material. The conductive member 170 may be a part of the enclosure 126 and/or inside of the enclosure. For example, the conductive member 170 may be integrated into the enclosure 126.

The yoke 120 may be approximately as wide as the enclosure 126, for example, to provide for capacitive coupling between the conductive member 170 and the yoke 120. If the load control device 100 is installed in a metal wallbox and the sides 121 of the yoke 120 (e.g., near the center of the yoke 120 where the conductive member 170 is capacitively coupled to the yoke) become electrically shorted to the metal wallbox, the communication range of the antenna at the communication frequency $f_{RF}$ may be affected. The load control device 100 may include a non-conductive element (not shown) to prevent the sides 121 of the yoke 120 from contacting the metal wallbox. For example, the non-conductive element (e.g., electrical tape) may be adhered to the sides 121 of the yoke 120. The non-conductive cradle 132 may have tabs (not shown) that extend out from the sides of the cradle 132 beyond the sides 121 of the yoke 120. The non-conductive cradle 132 may have flanges (not shown) that extend out from the sides of the cradle 132 and wrap around the sides 121 of the yoke 120. The non-conductive cradle 132 extend slightly beyond the sides 121 of the yoke 120 (e.g., by approximately 0.040"). The non-conductive cradle 132 may have one or more nubs (not shown) that are positioned in cut-outs (not shown) in the yoke 120, such that the nubs extend into the plane of the yoke 120 and extend beyond the sides 121 of the yoke 120.

The load control device 100 may comprise one or more conductive elements. For example, the load control device may comprise a conductive faceplate (e.g., a conductive faceplate 180, a conductive faceplate 220, and/or the like) and/or a conductive backer (e.g., a conductive backer 210, a conductive backer 230, and/or the like). The conductive elements may be partially or entirely made of a conductive material (e.g., a metallic material). The conductive elements may be capacitively coupled and/or electrically coupled to the driven element 150.

Figure 9:
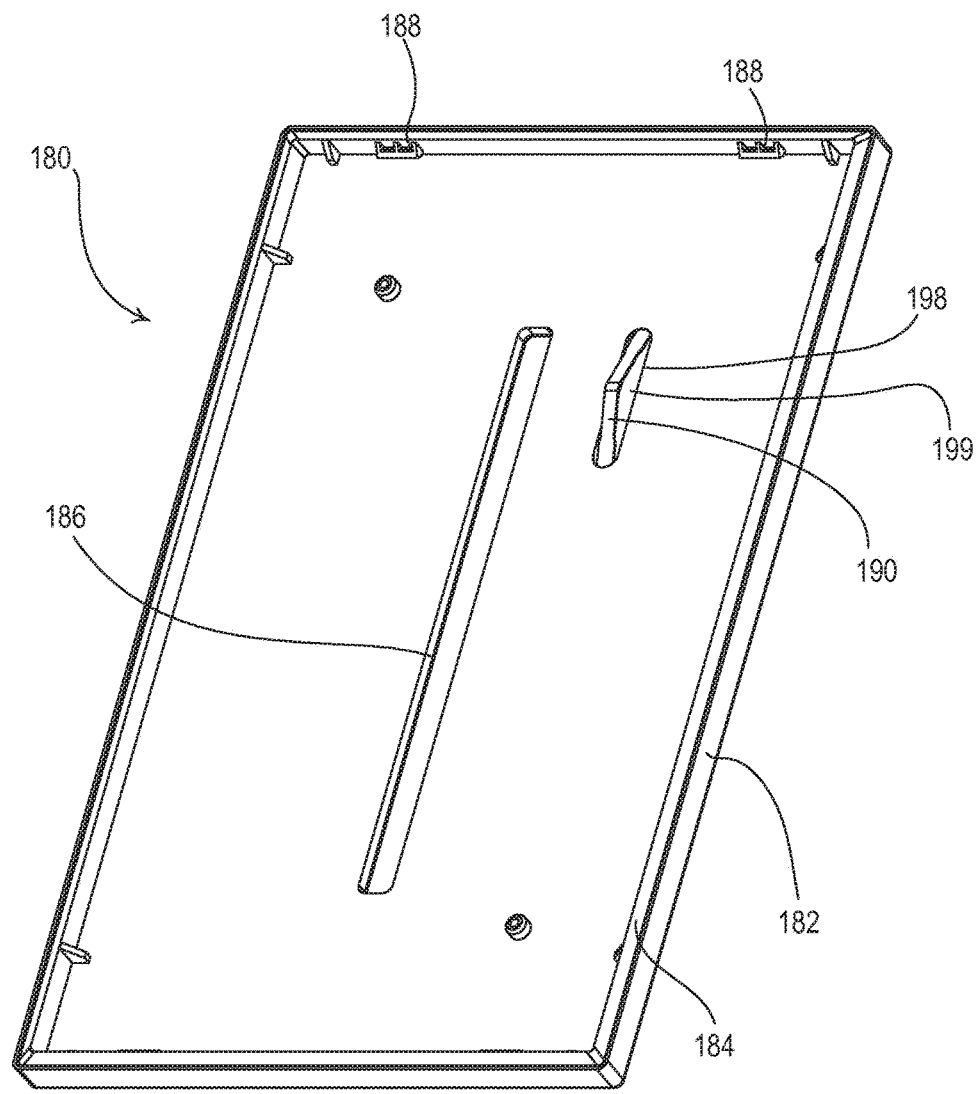
FIG. 9 is a rear perspective view an example conductive faceplate (e.g., a metal faceplate) that may be installed on the load control device of FIG. 1.
Figure 10:
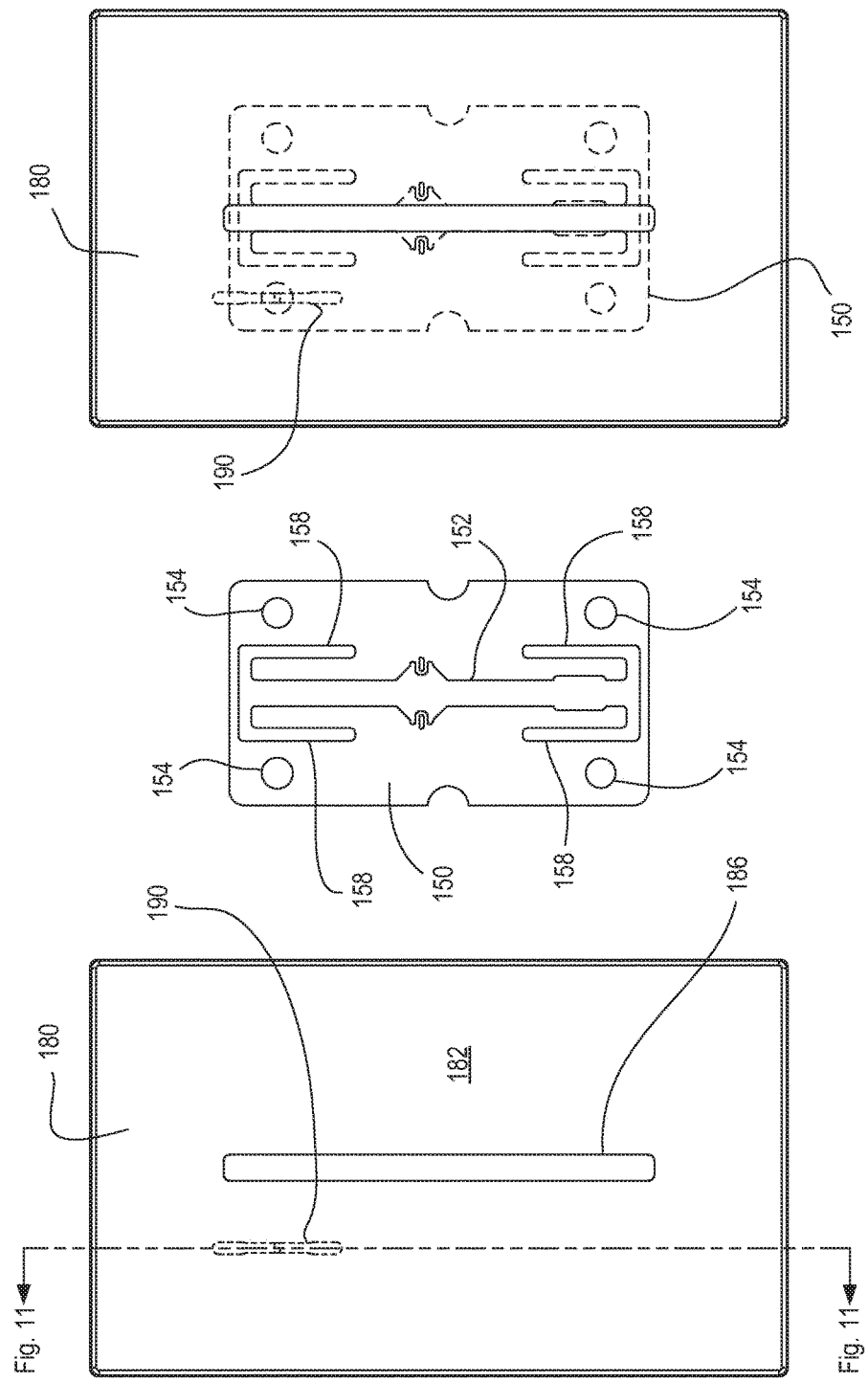
FIG. 10A is a front view of the conductive faceplate of FIG. 9.
FIG. 10B is a front view of a driven element of the antenna of the load control device of FIG. 1.
FIG. 10C is a front view of the conductive faceplate of FIG. 10A and the driven element of FIG. 10B overlaid overtop of each other.
Figure 13:
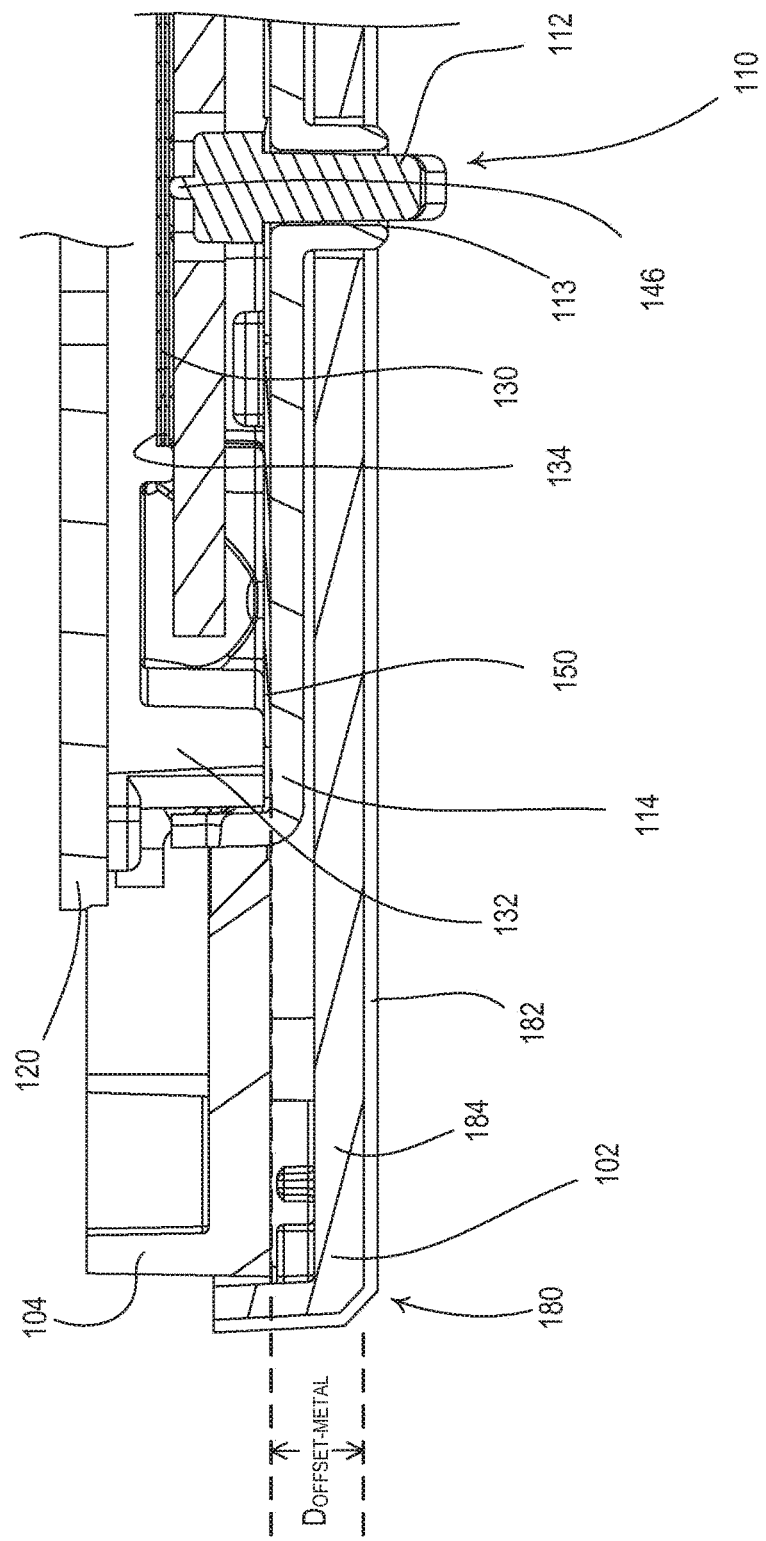
FIG. 13 is an enlarged partial top side cross-section view of the load control device of FIG. 1 with the conductive faceplate of FIG. 9 installed on the load control device.

As described herein, a conductive faceplate may be installed on the load control device 100. FIG. 9 is a rear perspective view and FIG. 10A is a front view of an example conductive faceplate 180. FIG. 10B is a front view of the driven element 150 of the antenna and FIG. 10C is a front view of the conductive faceplate 180 and the driven element 150 overlaid on top of each other. FIG. 11 is a partial right side cross-sectional view of the conductive faceplate 180. FIG. 12 is an enlarged perspective view of a conductive spring element 190 of the conductive faceplate 180. FIG. 13 is an enlarged partial top cross-section view of the load control device 100 with the conductive faceplate 180 installed.

The conductive faceplate 180 may include a conductive material 182, which for example, may be arranged over a plastic carrier 184. The conductive material 182 may be, for example, a conductive sheet, a conductive paint, a conducive label, and/or the like. For example, the plastic carrier 184 may be approximately the same size and shape as the plastic faceplate 102. The conductive faceplate 180 may form an opening 186 through which the bezel 114 of the load control device 100 may extend when the conductive faceplate 180 is installed on the load control device 100. The conductive material 182 may be substantially planar. For example, the conductive material 182 may be substantially planar except for outer portions that may wrap around the edges of the faceplate 180, for example, as illustrated in FIG. 9. For example, the conductive material 182 may be made from one or more metallic materials. The conductive material 182 may have one or more finishes. Example finishes for the conductive material 182 include satin nickel, antique brass, bright chrome, stainless steel, gold, clear anodized aluminum, etc. The plastic carrier 184 may include tabs 188 adapted to snap to tabs 109 on the top and bottom edges of the adapter 104. Similar to the plastic faceplate 102, the opening 186 of the conductive faceplate 180 may have a length $L_{OPENING}$ of approximately 2.83 inches and a width $W_{OPENING}$ of approximately 0.17 inches. The conductive faceplate 180 may have metallization on approximately 96% of the front surface. The aspect ratio of the conductive faceplate 180 may range from approximately 3:1 to 20:1, and/or the conductive faceplate 180 may have metallization on greater than or equal to approximately 85% of the front surface. The conductive faceplate 180 may be made entirely of metal. For example, the conductive faceplate 180 may not include the plastic carrier 184. The conductive material 182 may be integrated into the conductive faceplate 180, for example, internal to the plastic carrier 184.

The conductive material 182 may operate as a radiating element of the antenna. For example, the conductive material 182 may operate as the outer-most radiating element of the antenna when the conductive faceplate 180 is installed on the load control device 100. In other words, the conductive faceplate 180 may have a conductive surface (e.g., the conductive material 182). The conductive surface of the conductive faceplate 180 may provide a radiating structure for the radio-frequency signals transmitted from and/or received by the load control device 100 (e.g., via the ambient air). When the conductive faceplate 180 is installed on the load control device 100, the conductive material 182 may be located in a plane that is substantially parallel to a plane of the driven element 150 of the antenna. The conductive material 182 may be offset from the driven element 150 by a distance $D_{OFFSET-METAL}$ (e.g., approximately 0.113 inches) as shown in FIG. 13, such that the conductive material 182 is capacitively coupled to the driven element 150. As a result, the geometry and/or dimensions of the opening 186 of the conductive faceplate 180 may be a part of the radiating element of the antenna. The conductive material 182 may be electrically coupled directly to the driven element 150 and/or the wireless communication circuit 160.

The conductive material 182 may be electrically coupled to the yoke 120 at one point (e.g., to operate as a patch antenna). Accordingly, the load control device 100 may include a hybrid slot-patch antenna when the conductive faceplate 180 is installed on the load control device 100. The hybrid slot-patch antenna may be referred to as a slatch antenna. The conductive spring element 190 may operate to electrically couple the conductive material 182 to the yoke 120 through the screws 140 that attach the bezel 114 to the yoke 120.

As exemplified in FIG. 12, the conductive spring element 190 may be bent at a joint 192. The conductive spring element 190 may include two legs 194 that extend down to respective feet 196. The conductive spring element 190 may be received through an opening 198 in the plastic carrier 184, such that the feet 196 are captured between the conductive material 182 and the plastic carrier 184, and the feet 196 contact a back side 199 of the conductive material 182. When the conductive faceplate 180 is installed on the load control device 100, the joint 192 contacts one of the screws 140 and the conductive spring element 190 is compressed between the screw and the metallic plate 182. The conductive spring element 190 electrically couples together the metallic plate 182 and the yoke 120 via one of the screws 140 that extends through one of the openings 154 in the driven element 150 as shown in FIG. 10C.

Figure 14:
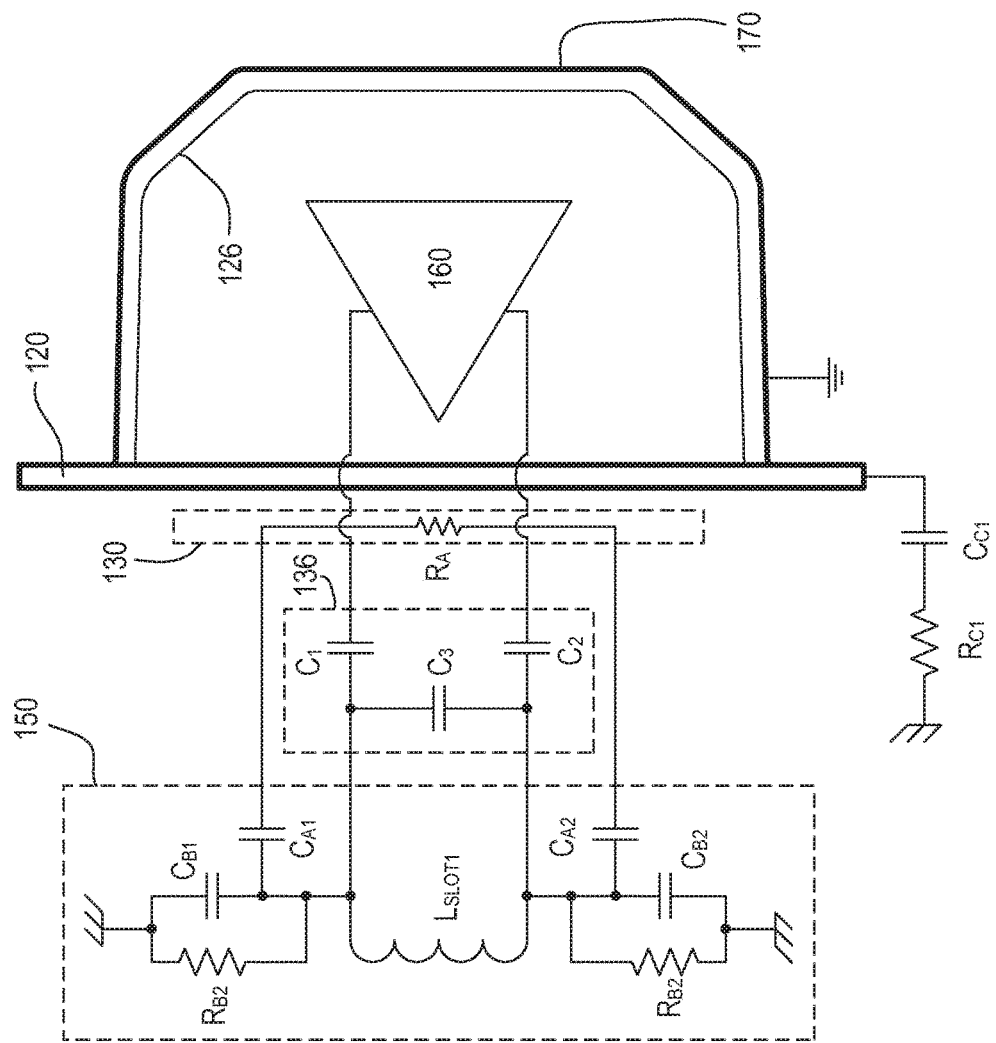
FIG. 14 is a simplified equivalent schematic diagram of the antenna of the load control device of FIG. 1 when no faceplate and/or a plastic faceplate (e.g., a 100% plastic faceplate) is installed on the load control device.
Figure 15:
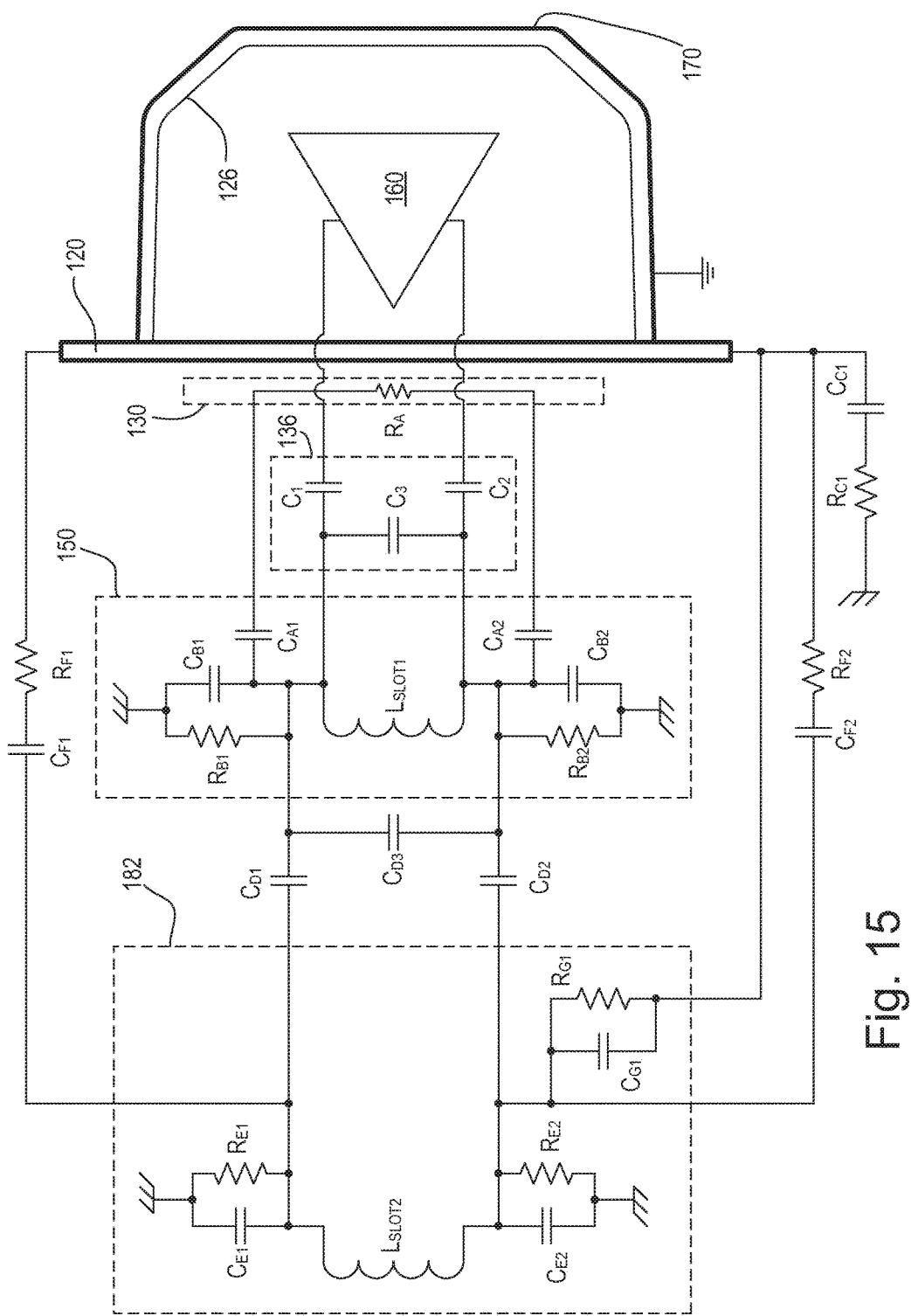
FIG. 15 is a simplified equivalent schematic diagram of the antenna of the load control device of FIG. 1 when a conductive faceplate is installed on the load control device.

FIG. 14 is a simplified equivalent schematic diagram of the antenna of the load control device 100 when no faceplate and/or a plastic faceplate (e.g., a 100% plastic faceplate, such as the plastic faceplate 102) is installed on the load control device 100. FIG. 15 is a simplified equivalent schematic diagram of the antenna of the load control device 100 when a conductive faceplate (e.g., the conductive faceplate 180) is installed on the load control device 100. The wireless communication circuit 160 may be located inside the enclosure 126. The conductive member 170 may wrap around the enclosure 126 extending between the sides of the yoke 120. As described herein, the conductive member 170 may include conductive paint, label, and/or strap 172. The main slot 152 of the driven element 150 may be characterized by an inductance $L_{SLOT1}$. The wireless communication circuit 160 is coupled to the driven element 150 via two capacitors $C_1$, $C_2$, which are located on (e.g., mounted to) the front PCB 136. Each of the capacitors $C_1$, $C_2$ may have a capacitance of, for example, approximately 2.2 pF. A capacitor $C_3$ (e.g., having a capacitance of approximately 4.3 pF) may be mounted to the front PCB 136. The capacitor $C_3$ may be electrically coupled between the drive points (e.g., the legs 155) of the driven element 150.

Each side of the driven element 150 (e.g., sides separated by the main slot 152) may be capacitively coupled through respective capacitances $C_{A1}$, $C_{A2}$ to the touch sensitive device 130, which may be characterized by a resistance $R_A$. Each side of the driven element 150 may be capacitively coupled to a common mode point. The common mode point may include the electrical traces coupled to the LEDs 149 on the front PCB 136. For example, a first side of the main slot 152 of the driven element 150 may be coupled to the common mode point via the parallel combination of a capacitance $C_{B1}$ and a resistance $R_{B1}$. A second side of the main slot 152 of the driven element 150 may be coupled to the common mode point via the parallel combination of a capacitance $C_{B2}$ and a resistance $R_{B2}$. The yoke 120 may be coupled to the common mode point via a high impedance path that may include the series combination of a capacitance $C_{C1}$ and a resistance $R_{C1}$.

When the conductive faceplate 180 is installed on the load control device 100 (e.g., as exemplified in FIG. 15), the sides of the driven element 150 may be capacitively coupled to the conductive material 182 via respective capacitances $C_{D1}$, $C_{D2}$. Capacitances $C_{D1}$, $C_{D2}$ may have values that are dependent upon the distance $D_{OFFSET-METAL}$ between the driven element 150 and the conductive material 182. The sides of the main slot 152 of the driven element 150 may be capacitively coupled together via a capacitance $C_{D3}$. Capacitance $C_{D3}$ may have a value that may depend upon the dimensions of the wrap-around slot portions 158 of the driven element 150. For example, the value of capacitance $C_{D3}$ may depend on the amount of the main slot 152 of the driven element 150 that does not overlap the opening 186 in the conductive material 182. The conductive material 182 may be directly electrically coupled to the driven element 150 and/or wireless communication circuit 160, e.g., via two drive points located on opposite sides of the elongated opening at approximately the middle of the elongated opening.

The opening 186 in the conductive material 182 of the conductive faceplate 180 may be characterized by an inductance $L_{SLOT2}$. The sides of the opening 186 in the conductive material 182 may be capacitively coupled to the common mode point through a first parallel combination of a capacitance $C_{E1}$ and a resistance $R_{E1}$, and a second parallel combination of a capacitance $C_{E2}$ and a resistance $R_{E2}$, respectively. The sides of the opening 186 of the conductive material 182 may be coupled to the yoke 120 via respective high impedance paths including a first series combination of a capacitance $C_{F1}$ and a resistance $R_{F1}$, and a second series combination of a capacitance $C_{F2}$ and a resistance $R_{F2}$, respectively. The conductive material 182 may be coupled to the yoke 120 through a low impedance path (e.g., through the conductive spring element 190 and one of the screws 140), an example of which is represented by the parallel combination of a capacitance $C_{G1}$ and a resistance $R_{G1}$ in FIG. 15.

Figure 16:
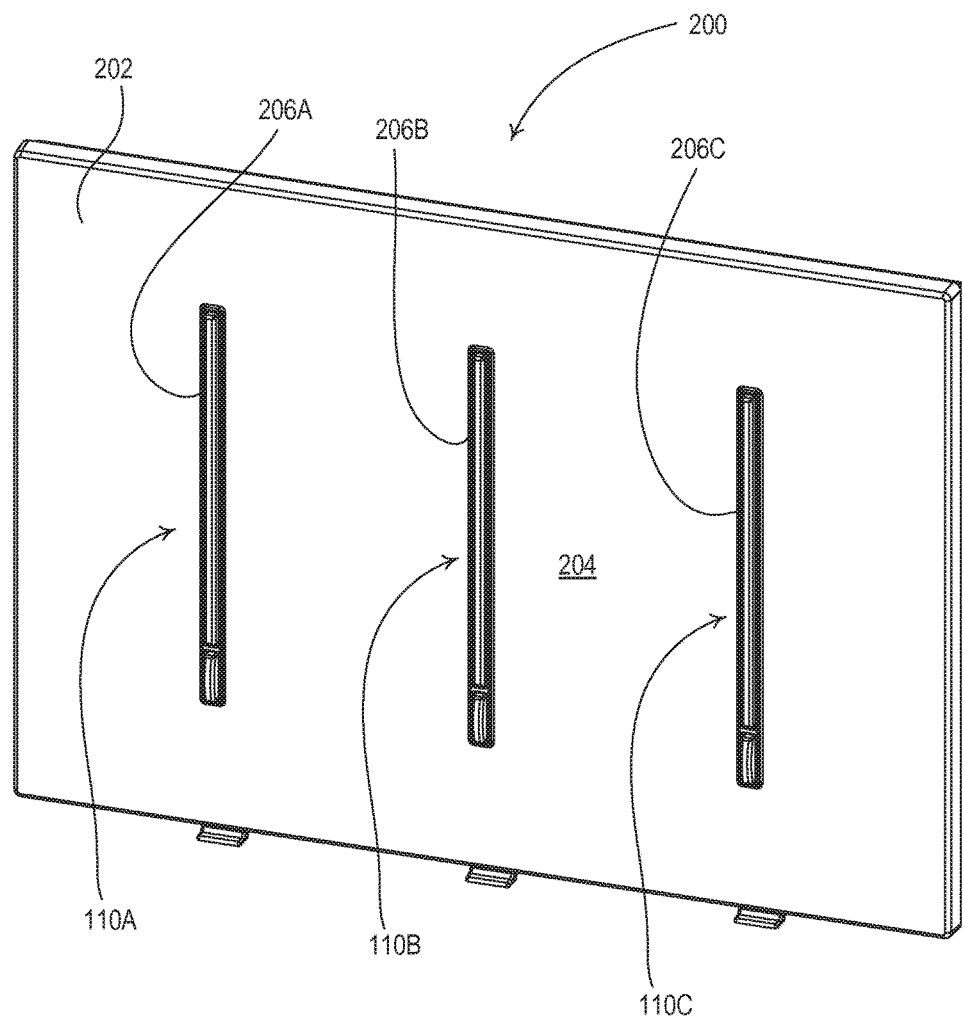
FIG. 16 is a perspective view of an example multi-gang installation having multiple load control devices with thin touch sensitive actuators.

FIG. 16 is a perspective view of an example multi-gang load control device installation 200 (e.g., a multi-gang control system). For example, a three-gang installation is shown in FIG. 16. The multi-gang installation 200 includes three load control devices installed in a multi-gang electrical wallbox (e.g., a three-gang wallbox). For example, each of the load control devices in the multi-gang installation 200 may be the same as the load control device 100 described above. The multi-gang installation 200 may include a multi-gang faceplate 202. The multi-gang face plate 202 may have a front surface 204 and three elongated openings 206A, 206B, 206C for receiving respective touch sensitive actuators 110A, 110B, 110C of the load control devices. The multi-gang faceplate 202 may be a conductive multi-gage faceplate (e.g., a metal multi-gang faceplate) and the front surface 204 may include a conductive material (e.g., similar to the single-gang conductive faceplate 180). The conductive material may be made from one or more metallic materials. The conductive material may be substantially planar.

Figure 17:
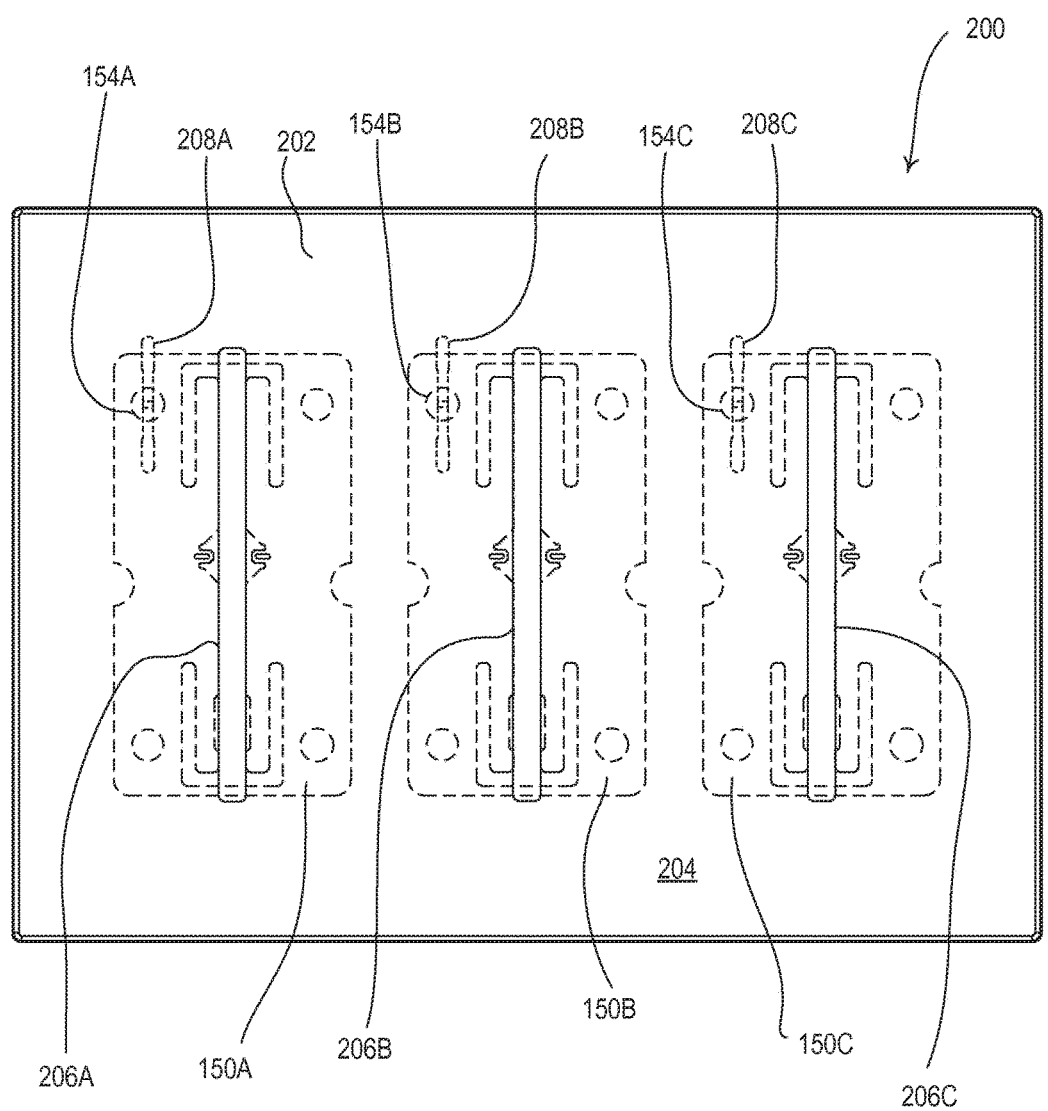
FIG. 17 is a front view of a multi-gang conductive faceplate of the multi-gang installation of FIG. 16 overlaid overtop of driven elements of antennas of the load control devices.

The load control devices may each include an antenna having a respective driven element 150A, 150B, 150C. FIG. 17 is a front view of the multi-gang conductive faceplate 202 overlaid overtop of the driven elements 150A, 150B, 150C. The multi-gang conductive faceplate 202 may include three conductive spring elements 208A, 208B, 208C (e.g., each similar to the conductive spring element 190 shown in FIGS. 11 and 12). The conductive spring elements 208A, 208B, 208C may each contact one of the screws 140 on the respective load control devices, such that the yoke 120 of each of the load control devices is electrically coupled to the conductive material of the front surface 204 of the multi-gang conductive faceplate 202. The conductive spring elements 208A, 208B, 208C may be configured to extend through respective openings 154A, 154B, 154C of the driven elements 150A, 150B, 150C to contact the respective screws 140. As shown in FIG. 17, the conductive spring elements 208A, 208B, 208C extend through the same opening 154A, 154B, 154C on each of the respective load control devices (e.g., the top left opening).

Figure 18:
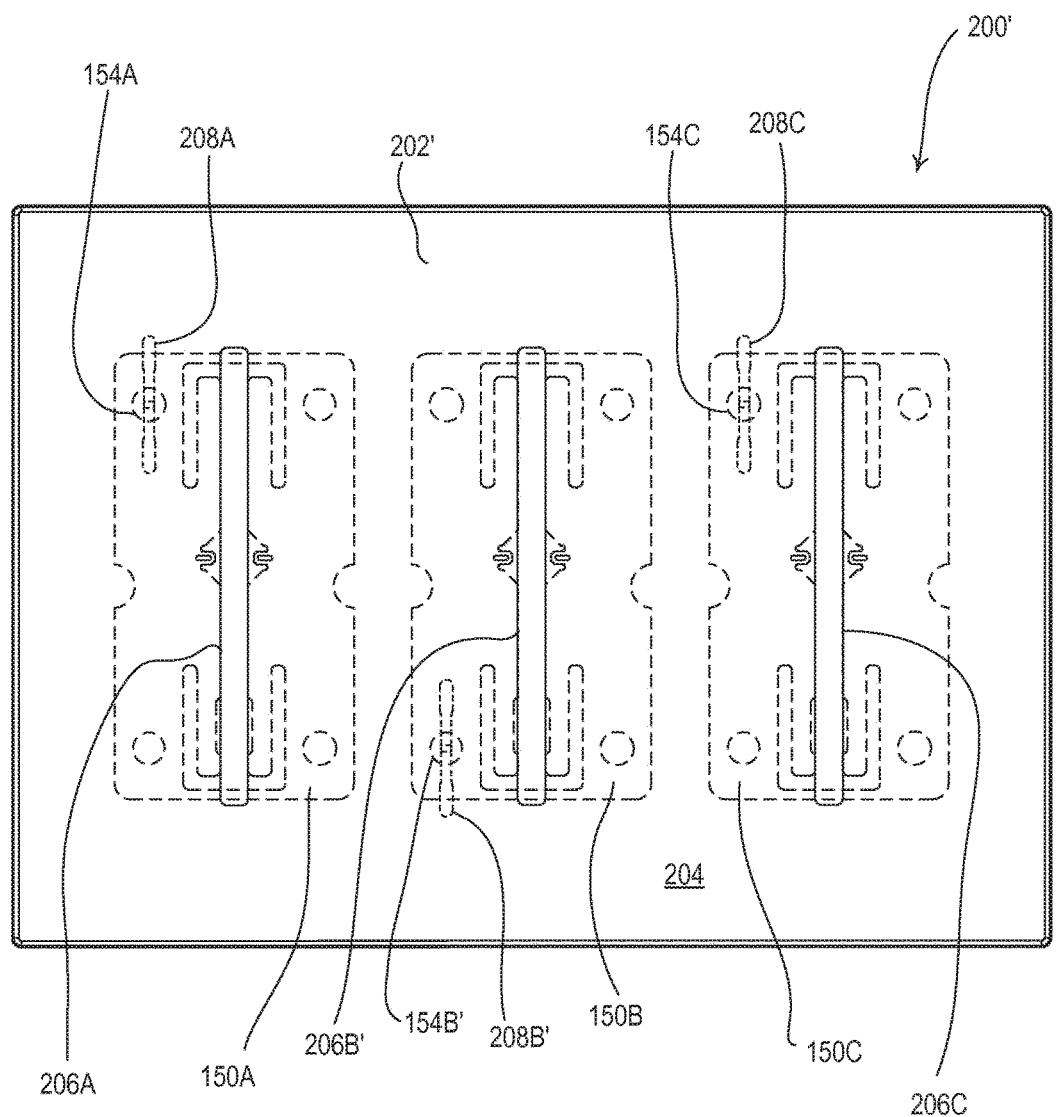
FIG. 18 is a front view of an alternate multi-gang conductive faceplate overlaid overtop of driven elements of antennas of the load control devices of FIG. 16.

The conductive spring elements 208A, 208B, 208C may extend through the different openings of the driven elements on each of the respective load control devices, for example, in order to optimize the efficiencies of the antennas of each of the load control devices in the multi-gang installation at the communication frequency $f_{RF}$. FIG. 18 is a front view of another example multi-gang conductive faceplate 202' and the driven elements 150A, 150B, 150C overlaid overtop of each other. The multi-gang conductive faceplate 202' may include conductive spring elements 208B' located near the bottom end of the middle opening 206B. The outer conductive spring elements 208A, 208C extend through the top left opening 154A, 154C of the respective driven elements 150A, 105C. The conductive spring element 208B' extends through an opening (e.g., a lower left opening 154B') of the middle driven element 150B that is relatively different from the openings that conductive spring elements 208A, 208C extend. Accordingly, the locations at which the driven elements 150A, 150B, 150C are coupled to the conductive material of the front surface 204 of the multi-gang conductive faceplate 202 may be dependent upon the communication frequency $f_{RF}$ of the load control devices.

As described herein, the impedance of the antenna of a load control device may be different based on whether the plastic faceplate 102, the conductive faceplate 180, or no faceplate is installed on the load control device. The communication frequency $f_{RF}$ of the wireless communication circuit 160 may be selected and/or the structure of the load control device may be designed, such that the communication range of the load control device at the communication frequency $f_{RF}$ is acceptable independent of whether the plastic faceplate 102, or the conductive faceplate 180 is installed. The communication range may be acceptable, for example, when the load control device is able to successfully receive and/or transmit RF signals. The load control device 100 may be characterized by a first communication range $R_1$ at the communication frequency $f_{RF}$ when the plastic faceplate 102, or no faceplate is installed. The load control device may be characterized by a second communication range $R_2$ when the conductive faceplate 180 is installed. The second communication range $R_2$ may be greater than the first communication range $R_1$. The first communication range $R_1$ may be greater than or equal to a minimum acceptable communication range $R_{MIN}$ (e.g., approximately 30 feet), such that the load control device is able to properly transmit and receive the RF signals when the plastic faceplate 102, or no faceplate is installed.

A faceplate (e.g., the plastic faceplate 102) may include a conductive backer 210. The conductive backer 210 may operate to bring the impedance of the antenna when the plastic faceplate 102 is installed closer to the impedance of the antenna when the conductive faceplate 180 is installed. The conductive backer 210 may comprise a conductive material, such as, for example, a metallic sheet and/or the like. The conductive backer 210 may be made from one or more metallic materials.

Figure 19:
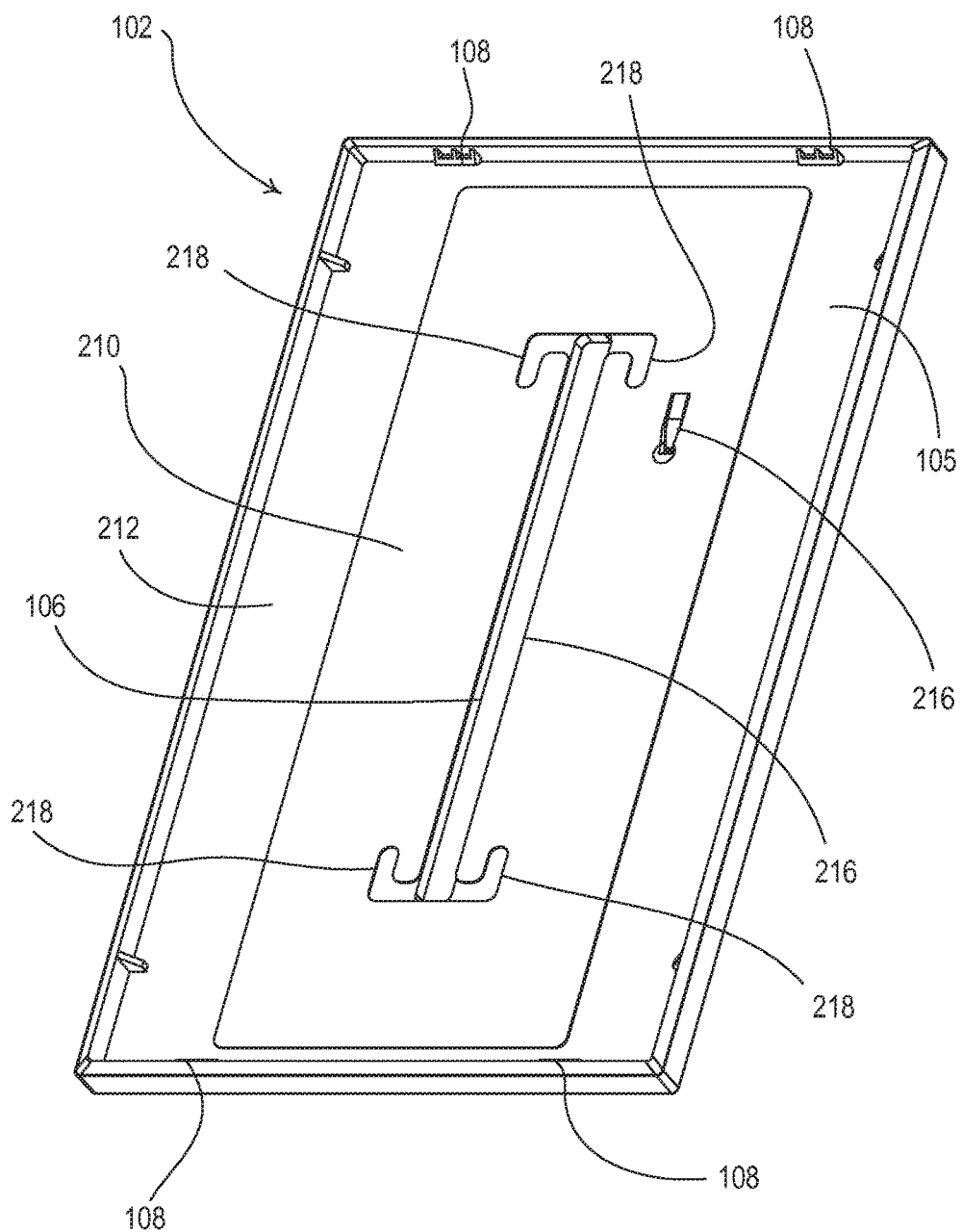
FIG. 19 is a rear perspective view of an example faceplate that may be installed on the load control device of FIG. 1, where the faceplate has a conductive backer attached to a rear surface of the faceplate.
Figure 20:
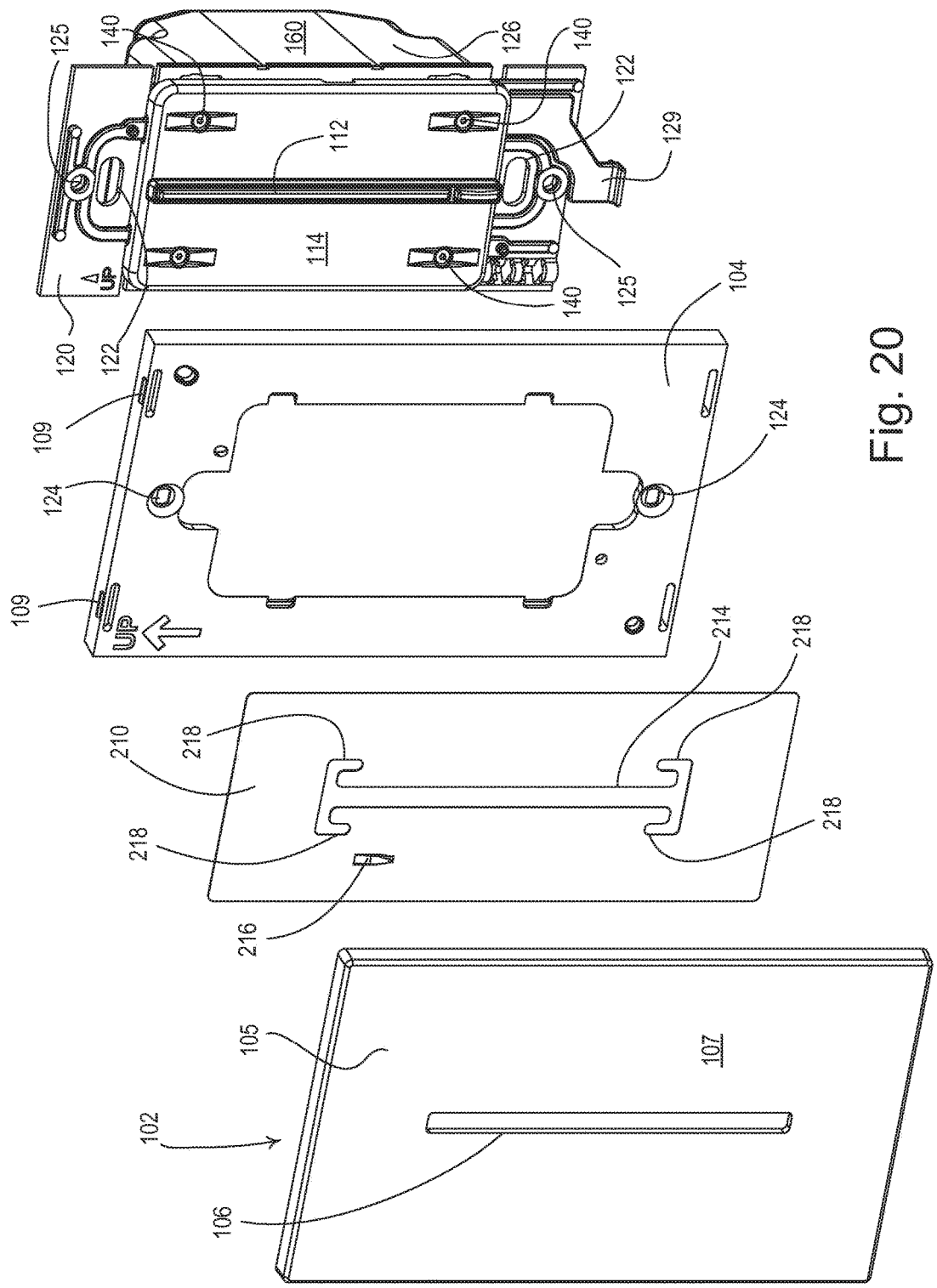
FIG. 20 is a partial exploded view of the load control device of FIG. 1 showing the faceplate of FIG. 19 removed from the load control device, and the conductive element removed from the faceplate.
Figure 21:
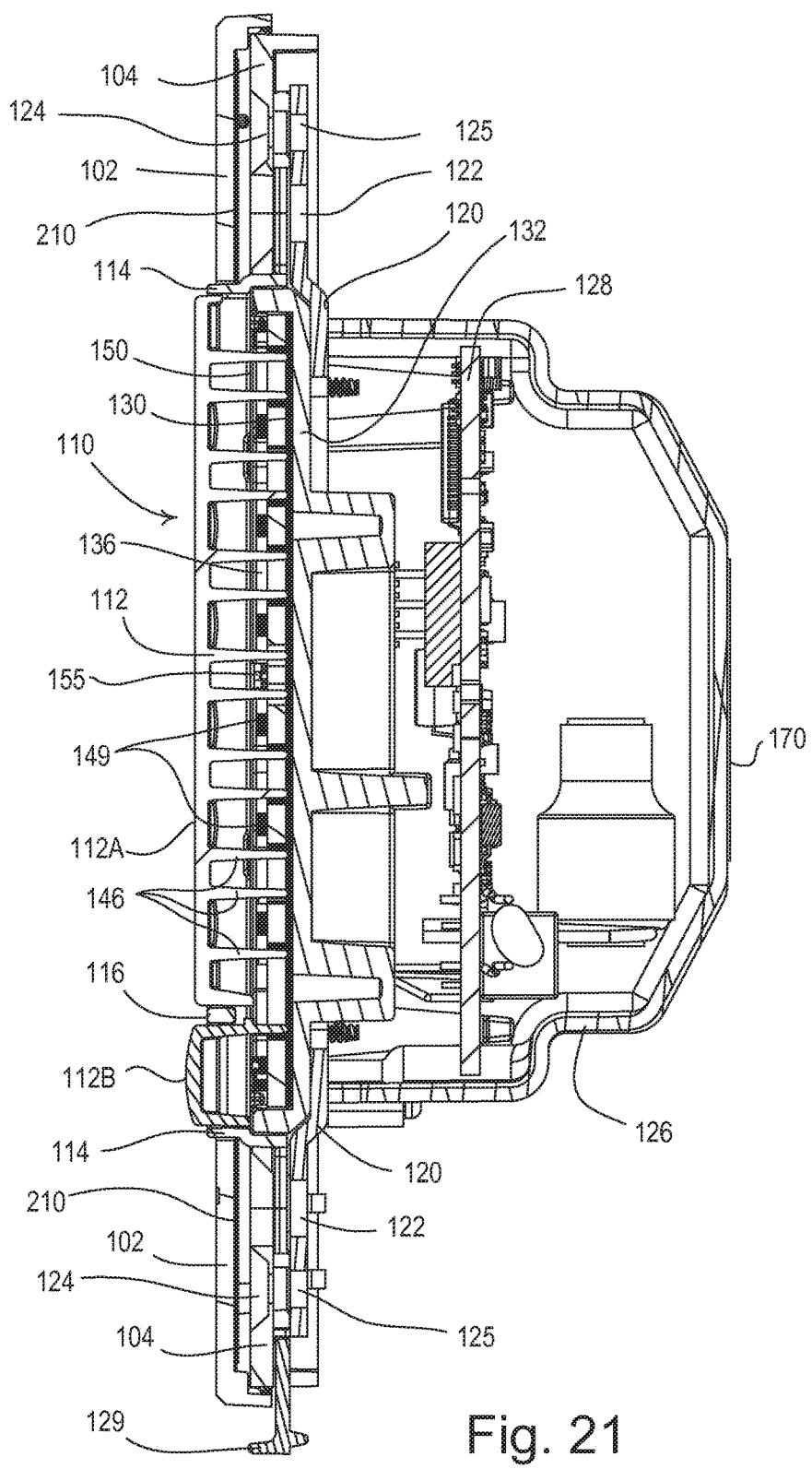
FIG. 21 is a right side cross-sectional view of the load control device of FIG. 1 taken through the center of the load control device as shown in FIG. 2 with the conductive element attached to the faceplate of FIG. 19.
Figure 22:
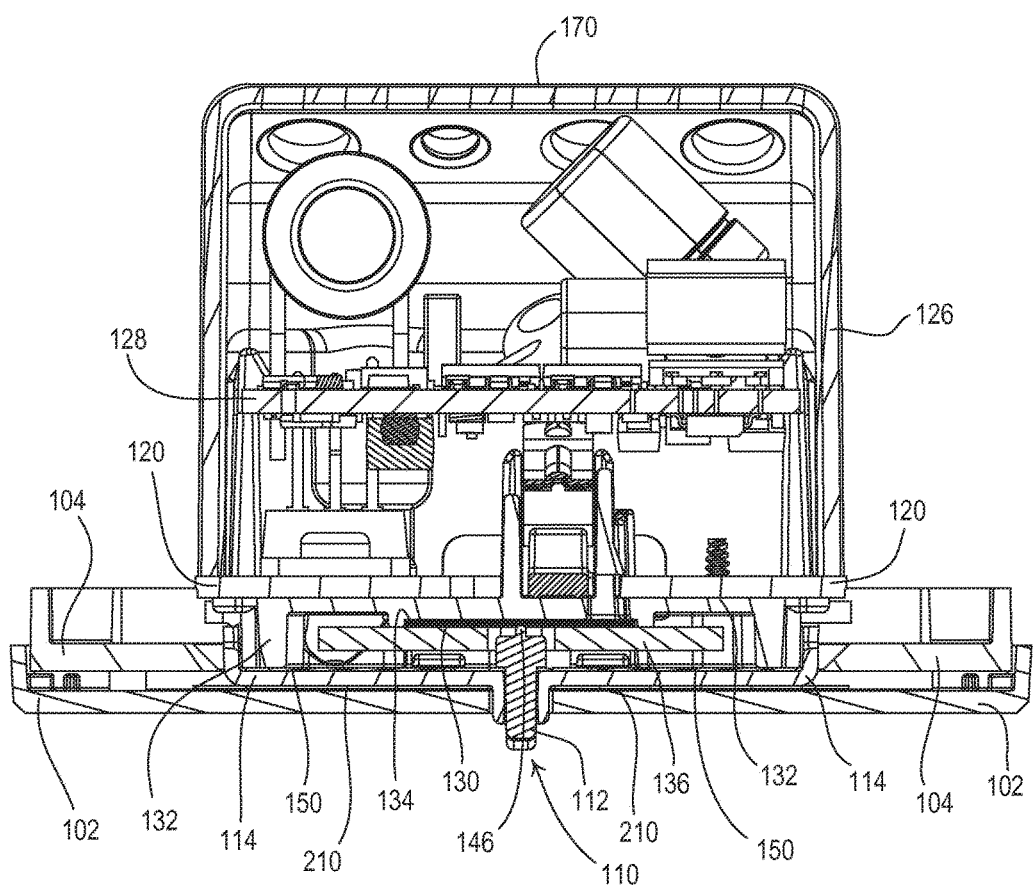
FIG. 22 is a top side cross-sectional view of the load control device of FIG. 1 taken through the center of the load control device as shown in FIG. 2 with the conductive element attached to the faceplate of FIG. 19.
Figure 23:
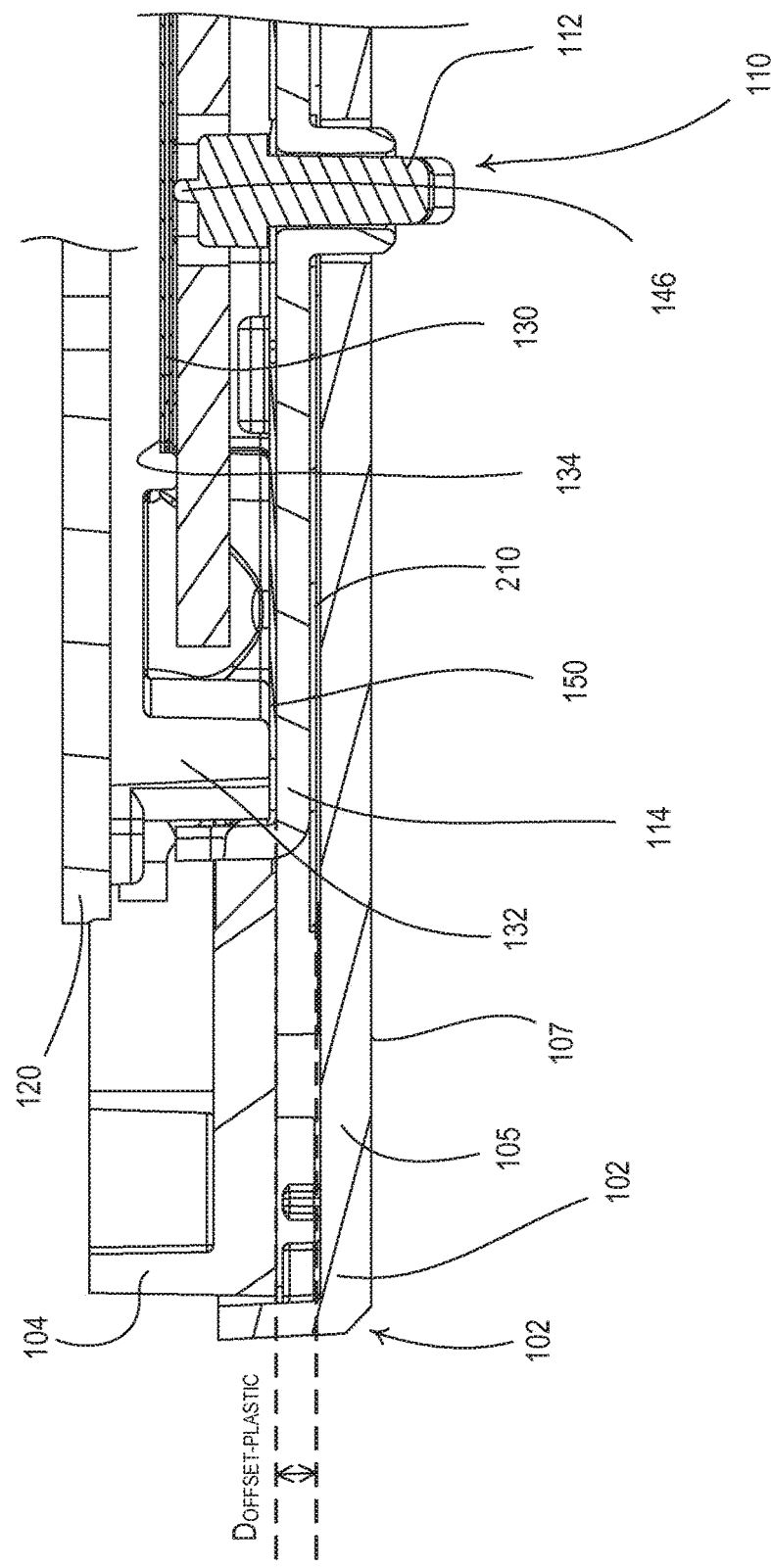
FIG. 23 is an enlarged partial top side cross-sectional view of the load control device of FIG. 1 taken through the center of the load control device as shown in FIG. 2 with the conductive element attached to the faceplate of FIG. 19.
Figure 24C:
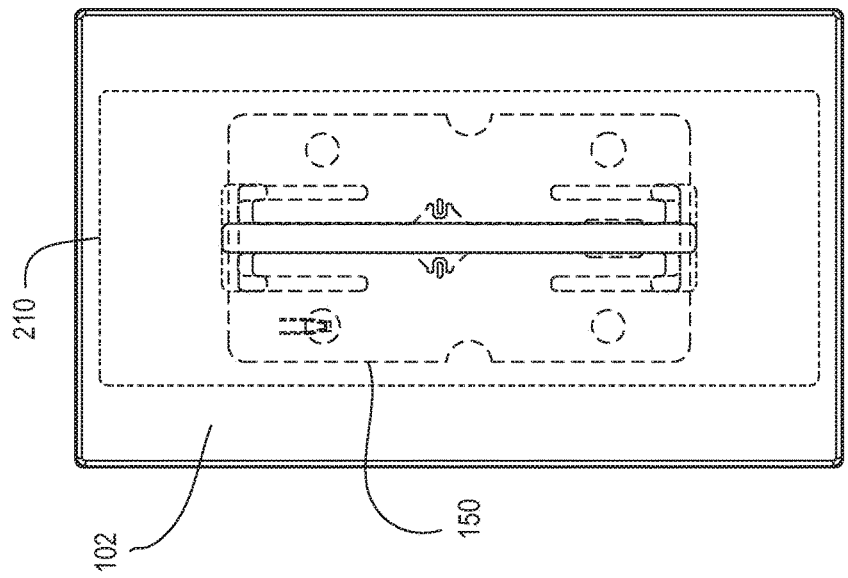
FIG. 24C is a front view of the faceplate of FIG. 19, the conductive element of FIG. 24A, and the driven element of FIG. 24B overlaid overtop of each other.
Figure 24B:
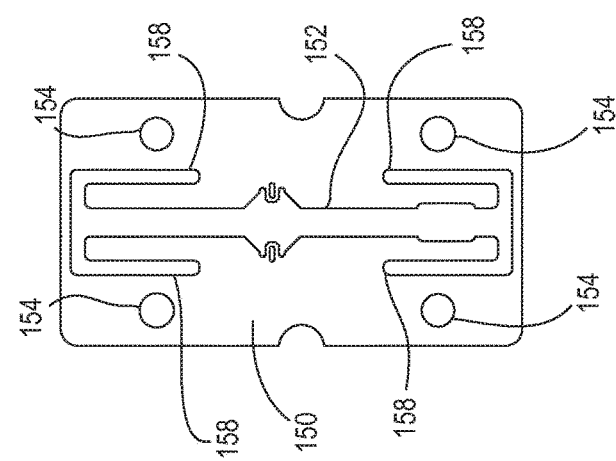
FIG. 24B is a front view of a driven element of the antenna of the load control device of FIG. 1.
Figure 24A:
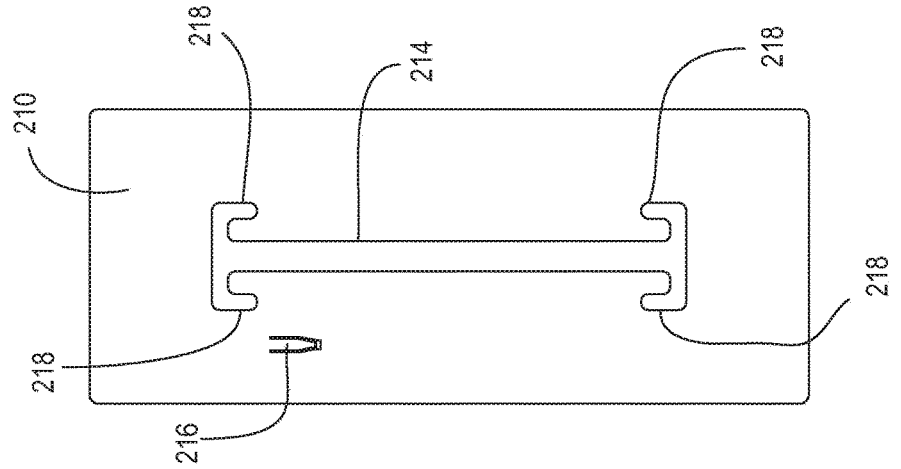
FIG. 24A is a front view of the conductive element of FIG. 19.

FIG. 19 is a rear perspective view of a plastic faceplate 102 having the conductive backer 210 attached to a rear surface 212 of the faceplate 102. FIG. 20 is a partial exploded view of the load control device 100 illustrating the plastic faceplate 102, where the adapter plate 104 has been removed from the load control device 100 and the conductive backer 210 has been removed from the plastic faceplate 102. FIG. 21 is a right side cross-sectional view of the load control device 100 taken through the center of the load control device 100 (e.g., as shown in FIG. 2) with the conductive backer 210 attached to the plastic faceplate 102. FIG. 22 is a top side cross-sectional view and FIG. 23 is an enlarged partial top side cross-sectional view of the load control device 100 taken through the center of the load control device (e.g., as shown in FIG. 2) with the conductive backer 210 attached to the plastic faceplate 102. FIG. 24A is a front view of the conductive backer 210, and FIG. 24B is a front view of the driven element 150 of the antenna of the load control device 100. FIG. 24C is a front view of the plastic faceplate 102, the conductive backer 210, and the driven element 150 overlaid overtop of each other.

When the plastic faceplate 102 having the conductive backer 210 is installed on the load control device 100, the conductive backer 210 may mimic the structure of the conductive material 182. The conductive backer 210 may operate as the radiating element of the antenna. For example, the conductive backer 210 may operate as the outer-most radiating element of the antenna if the plastic faceplate 102 having the conductive backer 210 is installed on the load control device 100. The conductive backer 210 may act as a radiating element and as a capacitive coupling member when the conductive faceplate 180 is installed on the load control device 100, and in such instances, the conductive faceplate 180 (e.g., the conductive material 182) may act as the outer-most radiating element of the antenna. For example, the conductive backer 210 may capacitively couple the conductive faceplate 180 to the driven element 150.

The conductive backer 210 may be located in a plane that is substantially parallel to a plane of the driven element 150 of the antenna, for example, as with the conductive material 182. The conductive backer 210 may be offset from the driven element 150 by a distance $D_{OFFSET-PLASTIC}$ (e.g., approximately 0.050 inches), for example as shown in FIG. 23. The conductive backer 210 may be directly connected or capacitively coupled to the opposite sides 121 of the yoke 120. The conductive elements 210 may be capacitively coupled to the driven element 150. The conductive backer 210 may include a central slot 214 that extends along the longitudinal axis of the load control device 100. The central slot 214 may be approximately the same size as the opening 106 in the plastic faceplate 102.

Figure 26:
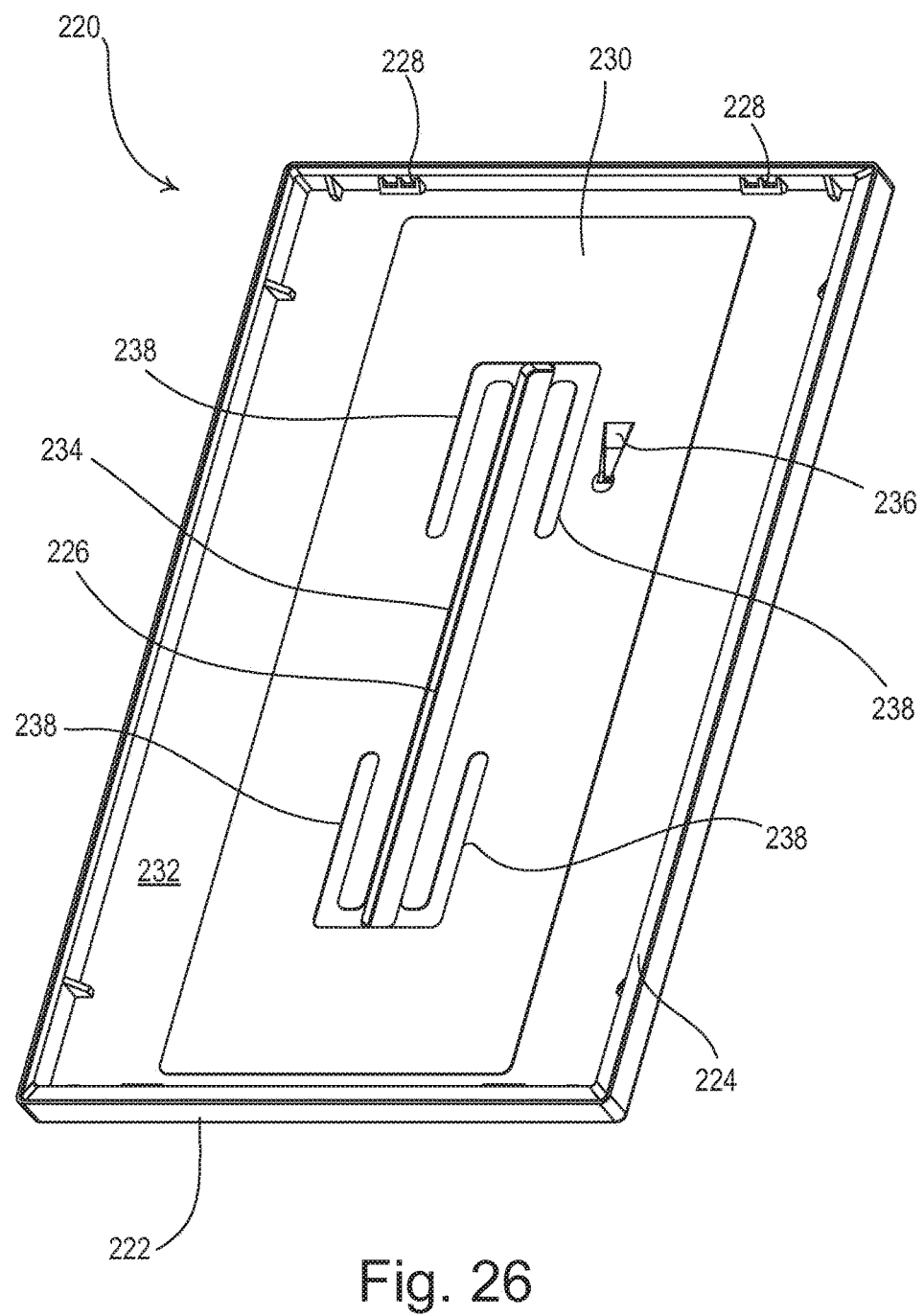
FIG. 26 is a rear perspective view another example conductive faceplate that may be installed on the load control device of FIG. 1, where the conductive faceplate has a conductive backer attached to a rear surface of the faceplate.
Figure 27:
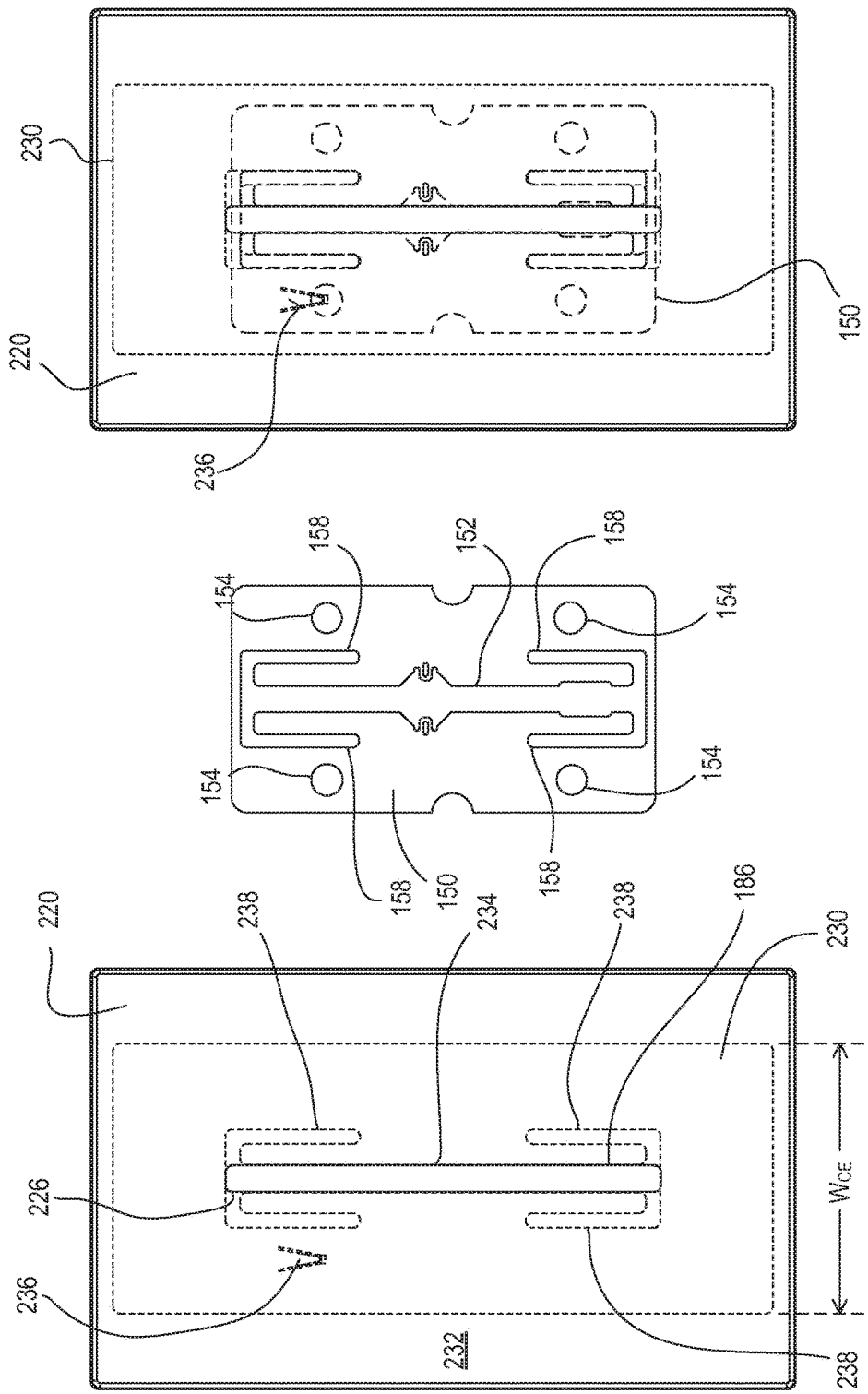
FIG. 27A is a front view of the conductive faceplate and the conductive element of FIG. 26.
FIG. 27B is a front view of a driven element of the antenna of the load control device of FIG. 1.
FIG. 27C is a front view of the conductive faceplate and the conductive element of FIG. 27A and the driven element of FIG. 27B overlaid overtop of each other.

The conductive backer 210 may be electrically coupled to the yoke 120 at one point, such that the antenna may operate as a patch antenna (e.g., a hybrid slot-patch, or slatch antenna). The conductive backer 210 may include a contact member 216. The contact member 216 may be formed as part of the conductive backer 210. The contact member 216 may be elongated. The contact member 216 may be biased towards the load control device 100. When the plastic faceplate 102 with the conductive backer 210 is installed on the load control device 100, the contact member 216 may contact one of the screws 140 that attaches the bezel 114 to the yoke 120 to electrically couple the conductive backer 210 to the yoke 120. The contact member 216 may be wider at the base where the contact member 216 meets the conductive backer 210 (e.g., as shown in FIGS. 26-27C). The contact member 216 may be of any shape, size, or structure to provide electrical connection between the conductive backer 210 and one of the screws 140. The conductive backer 210 may include wrap-around slot portions 218. The dimensions of the wrap-around slot portions 218 may be adjusted to change the impedance of the antenna, as described herein.

The conductive backer 210 may be formed as a part of the plastic faceplate 102, e.g., integrated onto a back surface of the plastic faceplate 102 or internal to the plastic faceplate 102. The conductive backer 210 may be attached to the adapter plate 104 (e.g., the front or rear surface of the adapter plate). The conductive element 210 may be electrically coupled to the yoke 120 via one of two conductive faceplate screws received through the openings 124 in the adapter and the openings 125 in the yoke 120.

Figure 25:
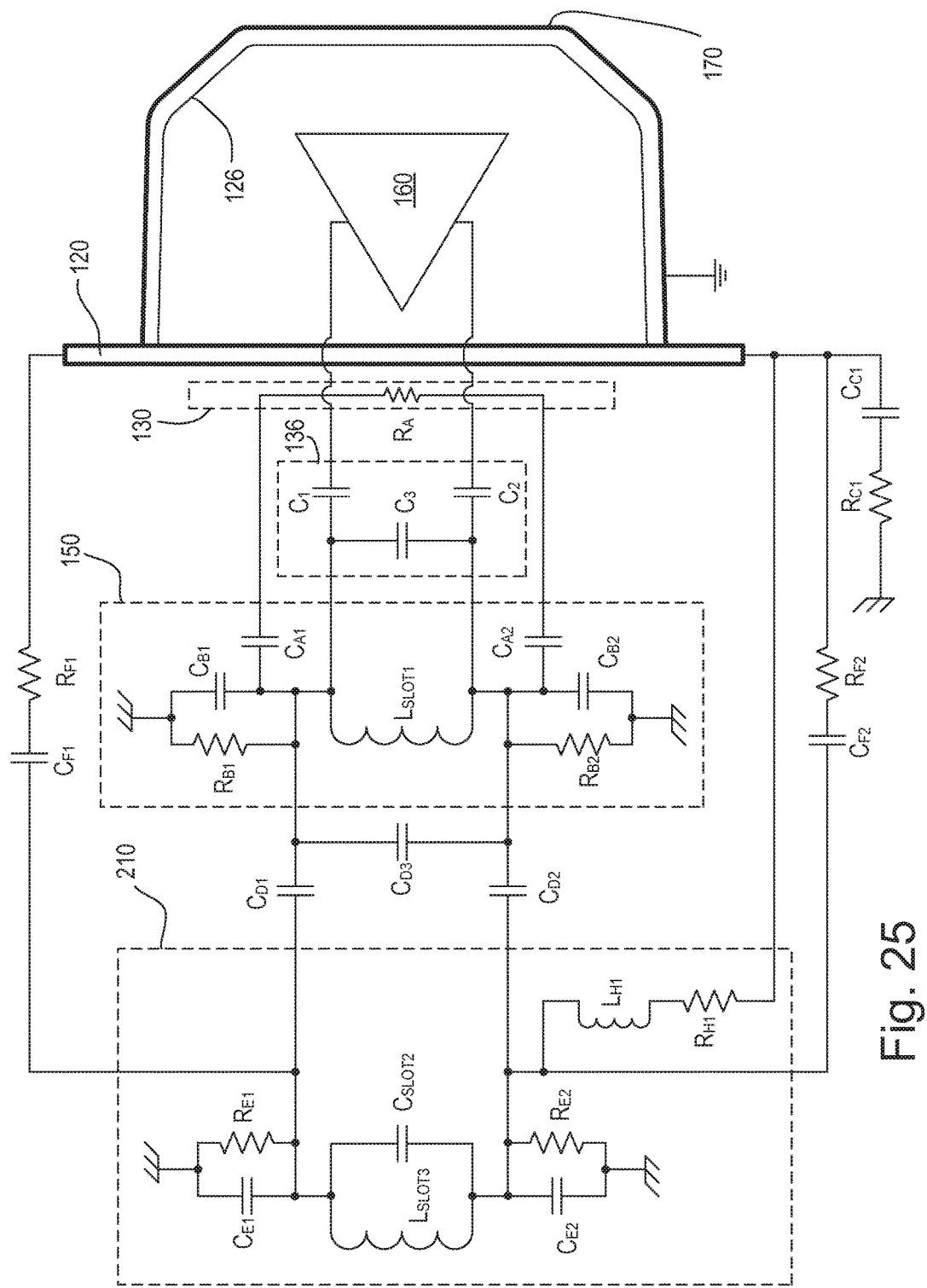
FIG. 25 is a simplified equivalent schematic diagram of the antenna of the load control device when the faceplate of FIG. 19 with the conductive element is installed on the load control device.

FIG. 25 is a simplified equivalent schematic diagram of the antenna of the load control device 100 when the plastic faceplate 102 with the conductive backer 210 is installed on the load control device. The central slot 214 of the conductive backer 210 may be characterized by an inductance $L_{SLOT3}$. The conductive backer 210 may be coupled to the yoke 120 through a low impedance path (e.g., through the contact member 216 and one of the screws 140), an example of which is represented by the series combination of an inductance $L_{H1}$ and a resistance $R_{H1}$ in FIG. 25. A distance $D_{OFFSET-PLASTIC}$ may refer to a distance between the driven element 150 and the conductive backer 210 on the plastic faceplate 102. A distance $D_{OFFSET-METAL}$ may refer to a distance between the driven element 150 and the metallic plate 182 of the conductive faceplate 180. The distance $D_{OFFSET-PLASTIC}$ may be smaller than the distance $D_{OFFSET-METAL}$. The values of the capacitances $C_{D1}$, $C_{D2}$ of the capacitive coupling between the conductive backer 210 and the driven element 150 may be larger, for example, because the distance $D_{OFFSET-PLASTIC}$ may be smaller than the distance $D_{OFFSET-METAL}$.

The value of the capacitance $C_{D3}$ between the sides of the main slot 152 of the driven element 150 may depend on the size of the wrap-around slot portions 218 of the conductive backer 210, for example, as compared to the size of the wrap-around slot portions 158 of the driven element 150. As the amount of overlap of the wrap-around slot portions 218 of the conductive backer 210 and the wrap-around slot portions 158 of the drive element increases, the value of the capacitance $C_{D3}$ between the sides of the main slot 152 of the driven element 150 may decrease, and vice versa. The dimensions (e.g., the lengths) of the wrap-around slot portions 218 of the conductive backer 210 may be adjusted to change the value of the capacitance $C_{D3}$. The value of the capacitance $C_{D3}$ may be changed to bring the impedance of the antenna with the plastic faceplate 102 having the conductive backer 210 being installed closer to the impedance of the antenna when the conductive faceplate 180 is installed. For example, the lengths of the wrap-around slot portions 218 of the conductive backer 210 may be increased and/or the widths of the wrap-around slot portions 218 may be increased to change the value of the capacitance $C_{D3}$. Increasing the lengths of the wrap-around slot portions 218 and/or the widths of the wrap-around slot portions 218 may bring the impedance of the antenna when the plastic faceplate 102 having the conductive backer 210 is installed closer to the impedance of the antenna when the conductive faceplate 180 is installed. Accordingly, the conductive backer 210 may provide a capacitive loading on the antenna that is approximately equal to the capacitive loading provided by the conductive faceplate 180 that has an equivalent size and shape as the plastic faceplate 102.

A conductive backer 210 may be mounted to a rear surface of the plastic carrier 184 of the conductive faceplate 180 (e.g., as shown in FIG. 9). FIG. 26 is a rear perspective view, and FIG. 27A is a front view of an example conductive faceplate 220 having a conductive backer 230. FIG. 27B is a front view of the driven element 150 of the antenna, and FIG. 27C is a front view of the conductive faceplate 220, the conductive backer 230, and the driven element 150 overlaid overtop of each other. The conductive faceplate 220 may include a conductive material 222 arranged over a plastic carrier 224. The conductive material 222 may be, for example, a conductive sheet, a conductive paint, a conductive label, and/or the like.

The conductive faceplate 220 may form an opening 226 through which the bezel 114 of the load control device 100 may extend when the conductive faceplate 220 is installed on the load control device 100. For example, the plastic carrier 224 and the opening 226 of the conductive faceplate 222 may be approximately the same size and shape as the plastic carrier 184 and the opening 186, respectively, of the conductive faceplate 180 shown in FIG. 9. The conductive material 222 may be substantially planar. For example, the conductive material 222 may be substantially planar except for the portions that wrap around the edges of the faceplate 220, for example, as shown in FIG. 26. The conductive material 222 may be made from one or more conductive, metallic materials. The conductive material 222 may one or more finishes. Example finishes include satin nickel, antique brass, bright chrome, stainless steel, gold, clear anodized aluminum, etc. The plastic carrier 224 may include tabs 228.

The tabs 228 may be adapted to snap to tabs 109 on the top and bottom edges of the adapter 104. The conductive faceplate 220 may have metallization on approximately 96% of the front surface. The aspect ratio of the conductive faceplate 220 may range from approximately 3:1 to 20:1, and/or the conductive faceplate 220 may have metallization on greater than or equal to approximately 85% of the front surface. The conductive faceplate 220 may be made entirely of metal. For example, the conductive faceplate 220 may not include the plastic carrier 224. The conductive material 222 may be integrated into the conductive faceplate 220, for example, internal to the plastic carrier 224.

The conductive backer 230 may include a conductive material, such as, for example, a metallic sheet, a conductive label, a conductive paint, and/or the like. The conductive backer 230 may be attached to a rear surface 232 of the plastic carrier 224 of the conductive faceplate 220. When the conductive faceplate 220 is installed on the load control device 100, the conductive backer 230 may be offset from the driven element 150 by a distance $D_{OFFSET-BACKER}$ (e.g., similar to the distance $D_{OFFSET-PLASTIC}$, such as approximately 0.050 inches). The conductive backer 230 may include a central slot 234 that extends along the longitudinal axis of the load control device 100. The central slot 234 may be approximately the same size as the opening 226 in the plastic carrier 224. The conductive material 222 and the conductive backer 230 may be located in respective planes that are substantially parallel to the plane of the driven element 150 of the antenna. The conductive material 222 of the conductive faceplate 220 may act as the outer-most radiating element of the antenna, for example, when the conductive faceplate 220 is installed on the load control device 100. The conductive backer 230 may act as the outer-most radiating element of the antenna, for example, when the conductive faceplate 220 is not installed on the load control device 100. If the conductive faceplate 220 is installed on the load control device 100, then the conductive backer 230 may act as a radiating element and the conductive material 222 may act as the outer-most radiating element of the antenna.

The conductive backer 230 may be electrically coupled to the yoke 120 at one point, such that the antenna also operates as a patch antenna (e.g., a hybrid slot-patch, or slatch antenna). The conductive backer 230 may include a contact member 236. The contact member 236 may be formed as part of the conductive backer 230. The contact member 236 may be biased towards the load control device 100. The contact member 236 may be triangularly-shaped and may be wider at the base than the contact member 216 of the conductive backer 210, for example, as shown in FIG. 19. When the conductive faceplate 220 is installed on the load control device 100, the contact member 236 may contact one of the screws 140 that attaches the bezel 114 to the yoke 120 to thus electrically couple the conductive backer 230 to the yoke 120. The contact member 216 may be narrower than the contact member 236, for example, as shown in FIGS. 19 and 26. The contact member 236 may be of any shape, size, or structure to provide electrical connection between the conductive backer 230 and one of the screws 140. The conductive backer 230 may provide consistency in the RF communication range of the load control device at the communication frequency $f_{RF}$ independent of the type of metallic material, or finish of the conductive material 222. The conductive backer 230 may provide for consistency with the electrical connection between the conductive backer 230 and the yoke 120 independent of the type of metallic material or finish of the conductive material 222.

The conductive backer 230 may include wrap-around slot portions 238. The wrap-around slot portions 238 may have dimensions that may be adjusted to change the impedance of the antenna. The slot portions 238 of the conductive backer 230 mounted to the conductive faceplate 220 may be sized and shaped to bring the impedance of the antenna when the conductive faceplate 220 with the conductive backer 230 is installed closer to the impedance of the antenna when the plastic faceplate 102 with the conductive backer 210 is installed. For example, the slot portions 238 of the conductive backer 230 mounted to the conductive faceplate 220 may be longer than the slot portions 218 of the conductive backer 210 mounted to the plastic faceplate 102 that are shown in FIG. 19. The slot portions 238 of the conductive backer 230 mounted to the conductive faceplate 220 may be sized and shaped, for example, to match the size and shape of the main slot 152 of the driven element 150 (e.g., as shown in FIG. 27C). A width $W_{CE}$ of the conductive backer 230 of the conductive faceplate 220 may be adjusted (e.g., trimmed) to bring the impedance of the antenna when the conductive faceplate 220 with the conductive backer 230 is installed closer to the impedance of the antenna when the plastic faceplate 102 with the conductive backer 210 is installed.

Figure 28:
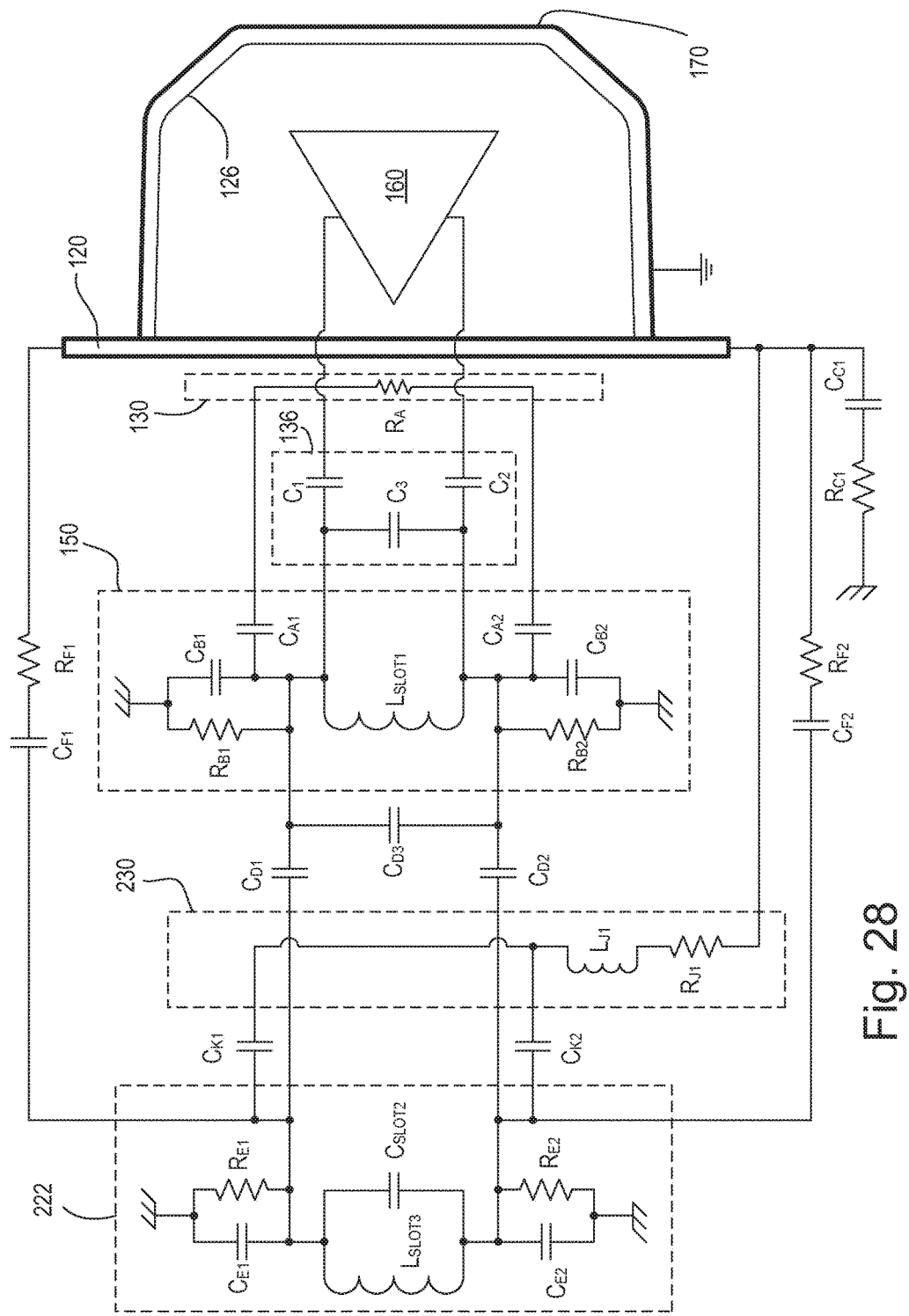
FIG. 28 is a simplified equivalent schematic diagram of the antenna of the load control device when the conductive faceplate of FIG. 26 with the conductive element is installed on the load control device.

FIG. 28 is a simplified equivalent schematic diagram of the antenna of the load control device 100 when the conductive faceplate 220 is installed on the load control device 100. The conductive backer 230 of the conductive faceplate 220 may be coupled to the yoke 120 through a low impedance path (e.g., through the contact member 236 and one of the screws 140), an example of which is represented by the series combination of an inductance $L_{J1}$ and a resistance $R_{J1}$ in FIG. 28. The opening 226 in the conductive material 222 of the conductive faceplate 220 may be characterized by the inductance $L_{SLOT2}$. The conductive backer 230 may be capacitively coupled to conductive material 222 on each side of the opening 226 via respective capacitances $C_{K1}$, $C_{K2}$. The combination of the conductive material 222 and the conductive backer 230 of the conductive faceplate 220 may provide a capacitive loading on the antenna that is approximately equal to the capacitive loading provided by the plastic faceplate 102 with the conductive backer 210.

Figure 29:
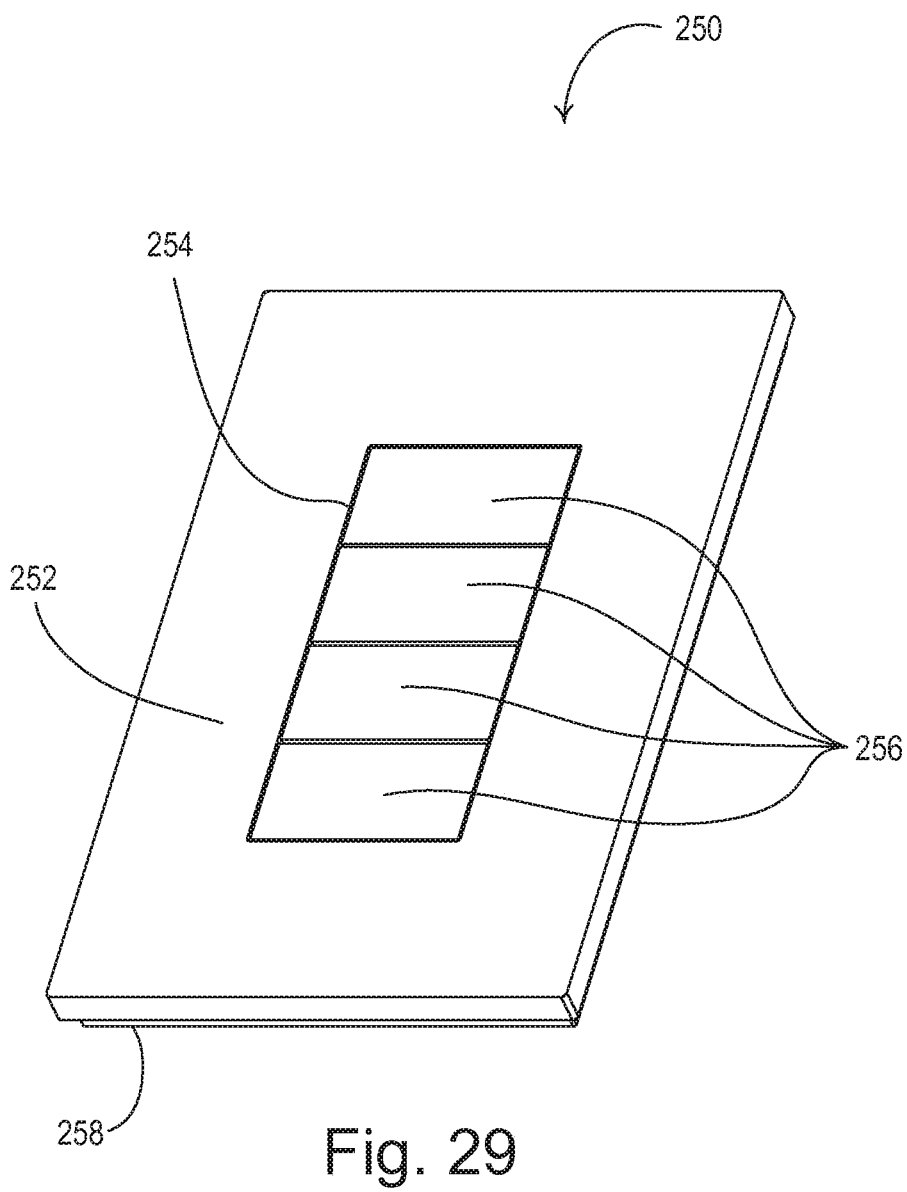
FIG. 29 is a perspective view of an example wireless control device.

FIG. 29 is a perspective view of an example wireless control device 250, e.g., a keypad device. The wireless control device 250 may include a faceplate 252 having an opening 254 for receiving a plurality of buttons 256. The faceplate 252 may be adapted to connect to an adapter plate 258 (e.g., in a similar manner as the faceplate 102 connects to the adapter plate 104). The wireless control device 250 may be configured to transmit RF signals in response to actuations of the buttons 256. The faceplate 252 may include a conductive faceplate. The faceplate 252 may include a conductive material arranged over a plastic carrier (e.g., such as the conductive faceplate 180). The buttons 256 may be made of a non-conductive material, such as plastic or glass. The wireless control device 250 may include an antenna having a driven element that is capacitively coupled to the conductive material of the faceplate 252, such that the conductive material operates as a radiating element of the antenna. The conductive material of the faceplate 252 may be directly electrically coupled to a yoke of the wireless control device 250 at a single electrical connection. The buttons 256 may be made of a conductive material, for example, a metallic sheet attached to a plastic carrier.

Figure 30:
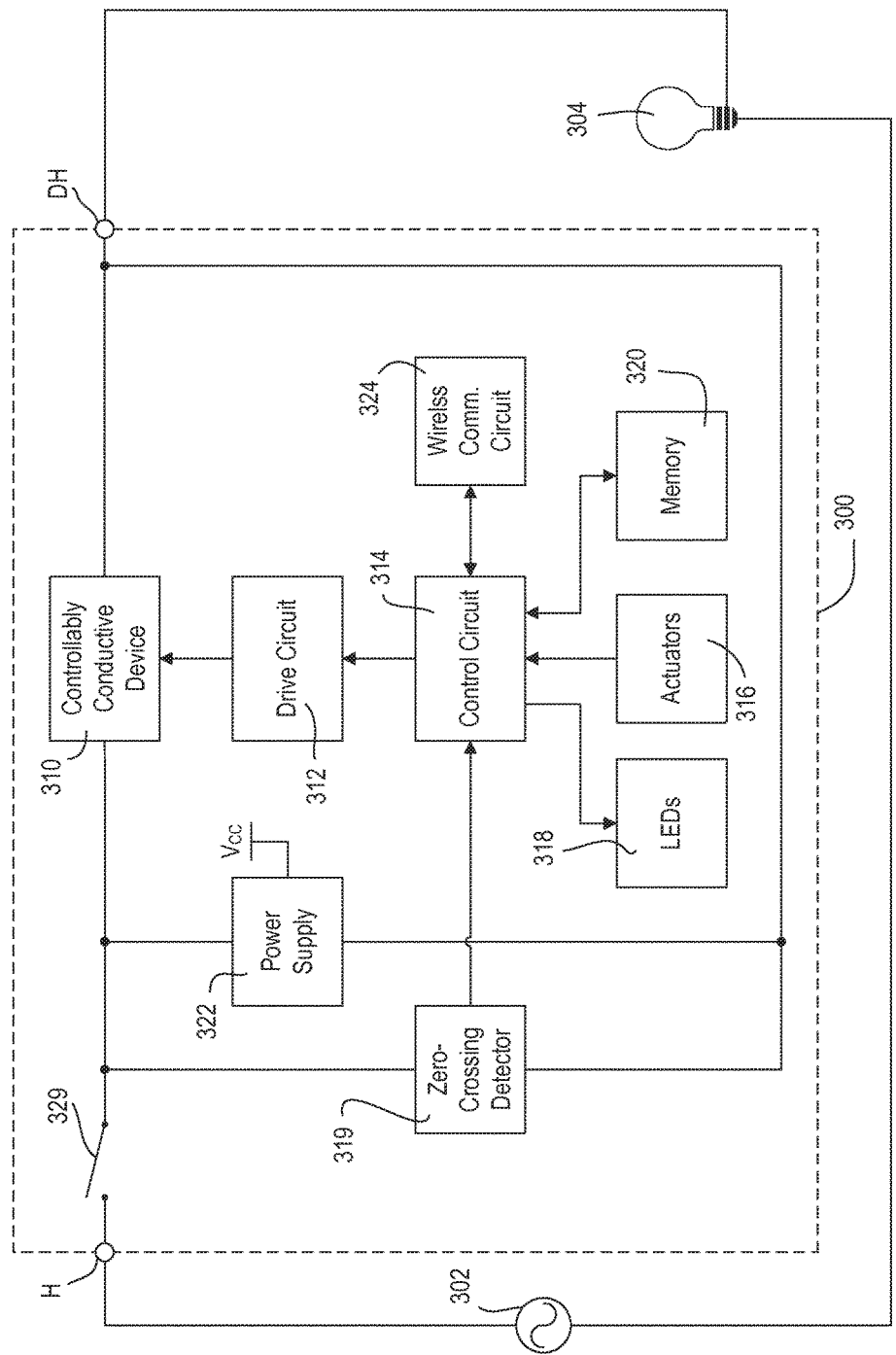
FIG. 30 is a simplified block diagram of an example load control device.

FIG. 30 is a simplified block diagram of an example load control device 300 that may be deployed as, for example, the load control device 100 shown in FIG. 1-28. The load control device 300 may include a hot terminal H that may be adapted to be coupled to an AC power source 302. The load control device 300 may include a dimmed hot terminal DH that may be adapted to be coupled to an electrical load, such as a lighting load 304. The load control device 300 may include a controllably conductive device 310 coupled in series electrical connection between the AC power source 302 and the lighting load 304. The controllably conductive device 310 may control the power delivered to the lighting load. The controllably conductive device 310 may include a suitable type of bidirectional semiconductor switch, such as, for example, a triac, a field-effect transistor (FET) in a rectifier bridge, two FETs in anti-series connection, or one or more insulated-gate bipolar junction transistors (IGBTs). An air-gap switch 329 may be coupled in series with the controllably conductive device 310. The air-gap switch 329 may be opened and closed in response to actuations of an air-gap actuator (e.g., the air-gap switch actuator 129). When the air-gap switch 329 is closed, the controllably conductive device 310 is operable to conduct current to the load. When the air-gap switch 329 is open, the lighting load 304 is disconnected from the AC power source 302.

The load control device 300 may include a control circuit 314. The control circuit 314 may include one or more of a processor (e.g., a microprocessor), a microcontroller, a programmable logic device (PLD), a field programmable gate array (FPGA), an application specific integrated circuit (ASIC), or any suitable controller or processing device. The control circuit 314 may be operatively coupled to a control input of the controllably conductive device 310, for example, via a gate drive circuit 312. The control circuit 314 may be used for rendering the controllably conductive device 310 conductive or non-conductive, for example, to control the amount of power delivered to the lighting load 304. The control circuit 314 may receive inputs from a touch sensitive actuator 316 (e.g., the touch sensitive actuator 110). The control circuit 314 may individually control LEDs 318 (e.g., the LEDs 149) to illuminate a linear array of visual indicators on the touch sensitive actuator.

The control circuit 314 may receive a control signal representative of the zero-crossing points of the AC main line voltage of the AC power source 302 from a zero-crossing detector 319. The control circuit 314 may be operable to render the controllably conductive device 310 conductive and/or non-conductive at predetermined times relative to the zero-crossing points of the AC waveform using a phase-control dimming technique. Examples of dimmers are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are hereby incorporated by reference.

The load control device 300 may include a memory 320. The memory 320 may be communicatively coupled to the control circuit 314 for the storage and/or retrieval of, for example, operational settings, such as, lighting presets and associated preset light intensities. The memory 320 may be implemented as an external integrated circuit (IC) or as an internal circuit of the control circuit 314. The load control device 300 may include a power supply 322. The power supply 322 may generate a direct-current (DC) supply voltage $V_{CC}$ for powering the control circuit 314 and the other low-voltage circuitry of the load control device 300.

The power supply 322 may be coupled in parallel with the controllably conductive device 310. The power supply 322 may be operable to conduct a charging current through the lighting load 304 to generate the DC supply voltage $V_{CC}$.

The load control device 300 may include a wireless communication circuit 324 (e.g., the wireless communication circuit 160). The wireless communication circuit 324 may include a RF transceiver coupled to an antenna for transmitting and/or receiving RF signals. For example, the antenna may include the slot or slatch antenna of the load control device 100 shown in FIG. 1-28. The control circuit 314 may be coupled to the wireless communication circuit 324 for transmitting and/or receiving digital messages via the RF signals. The control circuit 314 may be operable to control the controllably conductive device 310 to adjust the intensity of the lighting load 304 in response to the digital messages received via the RF signals. The control circuit 314 may transmit feedback information regarding the amount of power being delivered to the lighting load 304 via the digital messages included in the RF signals. The control circuit 314 may be configured to transmit RF signals while the touch sensitive actuator 316 is being actuated, since the communication range of the antenna may be temporarily increased while a user's finger is adjacent the main slot 152 of the driven element 150. The wireless communication circuit 324 may include an RF transmitter for transmitting RF signals, an RF receiver for receiving RF signals, or an infrared (IR) transmitter and/or receiver for transmitting and/or receiving IR signals.

Figure 31:
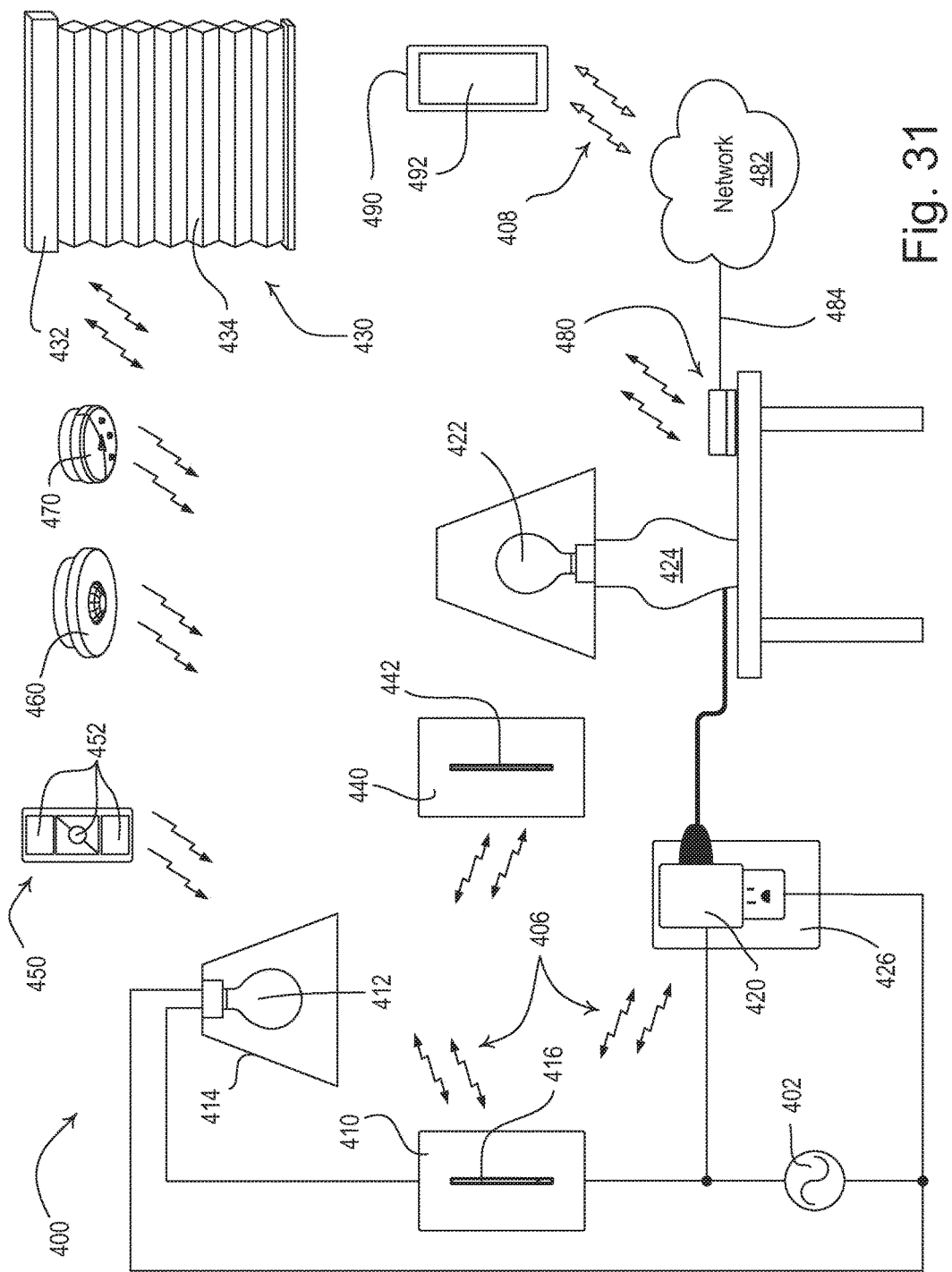
FIG. 31 is a simple diagram of an example load control system.

FIG. 31 is a simple diagram of an example load control system 400 (e.g., a lighting control system) in which a wall-mounted load control device 410 having a thin touch sensitive actuator (e.g., the load control device 100 and/or the load control device 300) may be deployed. The wall-mounted load control device 410 may be coupled in series electrical connection between an AC power source 402 and a first lighting load, e.g., a first light bulb 412 installed in a ceiling mounted downlight fixture 414. The first light bulb 412 may be installed in a wall-mounted lighting fixture or other lighting fixture mounted to another surface. The wall-mounted load control device 410 may be adapted to be wall-mounted in a standard electrical wallbox. The load control system 400 may include another load control device, e.g., a plug-in load control device 420. The plug-in load control device 420 may be coupled in series electrical connection between the AC power source 402 and a second lighting load, e.g., a second light bulb 422 installed in a lamp (e.g., a table lamp 424). The plug-in load control device 420 may be plugged into an electrical receptacle 426 that is powered by the AC power source 402. The table lamp 424 may be plugged into the plug-in load control device 420. The second light bulb 422 may be installed in a table lamp or other lamp that may be plugged into the plug-in load control device 420. The plug-in load control device 420 may be implemented as a table-top load control device, or a remotely-mounted load control device.

The wall-mounted load control device 410 may include a touch sensitive actuator 416 (e.g., the touch sensitive actuator 110 of the load control device 100 or the touch sensitive actuator 316 of the load control device 300) for controlling the light bulb 412. In response to actuation of the touch sensitive actuator 416, the wall-mounted load control device 410 may be configured to turn the light bulb 412 on and off, and to increase or decrease the amount of power delivered to the light bulb. The wall-mounted load control device 410 may vary the intensity of the light bulb by varying the amount of power delivered to the light bulb. The wall-mounted load control device 410 may increase or decrease the intensity of the light bulb from a minimum intensity (e.g., approximately 1%) to a maximum intensity (e.g., approximately 100%). The wall-mounted load control device 410 may be configured to provide visual indicators. The visual indicators may be arranged in a linear array on the touch sensitive actuator 416. The wall-mounted load control device 410 may be configured to illuminate the visual indicators to provide feedback of the intensity of the light bulb 412. Examples of wall-mounted dimmer switches are described in greater detail in U.S. Pat. No. 5,248,919, issued Sep. 29, 1993, entitled LIGHTING CONTROL DEVICE, and U.S. patent application Ser. No. 13/780,514, filed Feb. 28, 2013, entitled WIRELESS LOAD CONTROL DEVICE, the entire disclosures of which are hereby incorporated by reference.

The load control system 400 may include a daylight control device, e.g., a motorized window treatment 430, mounted in front of a window for controlling the amount of daylight entering the space in which the load control system 400 is installed. The motorized window treatment 430 may include, for example, a cellular shade, a roller shade, a drapery, a Roman shade, a Venetian blind, a Persian blind, a pleated blind, a tensioned roller shade systems, or other suitable motorized window covering. The motorized window treatment 430 may include a motor drive unit 432 for adjusting the position of a covering material 434 of the motorized window treatment (e.g., a cellular shade fabric as shown in FIG. 1) in order to control the amount of daylight entering the space. The motor drive unit 432 of the motorized window treatment 430 may have an RF receiver and an antenna mounted on or extending from a motor drive unit of the motorized window treatment. The motor drive unit 432 of the motorized window treatment 430 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. patent application Ser. No. 13/798,946, filed Mar. 13, 2013, entitled BATTERY-POWERED ROLLER SHADE SYSTEM, the entire disclosures of which are hereby incorporated by reference.

The load control system 400 may include one or more input devices, e.g., RF transmitters, such as a wall-mounted remote control device 440, a battery-powered handheld remote control device 450, an occupancy sensor 460, or a daylight sensor 470. The wall-mounted load control device 410 and/or the plug-in load control device 420 may be configured to receive digital messages via wireless signals, e.g., radio-frequency (RF) signals 406. The wireless signals may be transmitted by the wall-mounted remote control device 440, the battery-powered remote control device 450, the occupancy sensor 460, or the daylight sensor 470. In response to the received digital messages, the wall-mounted load control device 410 and/or the plug-in load control device 420 may be configured to turn the respective light bulb 412, 422 on and off, and to increase or decrease the intensity of the respective light bulb. The wall-mounted load control device 410 and/or the plug-in load control device 420 may be implemented as electronic switches configured to turn on and off (e.g., only turn on and off) the respective light bulbs 412, 422.

The wall-mounted remote control device 440 may include a thin touch sensitive actuator 442 (e.g., similar to the touch sensitive actuator 416 of the wall-mounted load control device 410). The wall-mounted remote control device 440 may not include an internal load control circuit. The wall-mounted remote control device 440 may not directly be connected to an electrical load. The wall-mounted remote control device 440 may transmit RF signals 406 in response to actuations of the touch sensitive actuator 442. For example, the RF signals 406 may be transmitted at a communication frequency $f_{RF}$ (e.g., approximately 434 MHz) using a proprietary RF protocol, such as the ClearConnect® protocol. The wall-mounted load control device 410 may be configured to receive the RF signals transmitted by the wall-mounted remote control device 440, for example, to control the light bulb 412 in response to actuations of the thin touch sensitive actuator 442 of the wall-mounted remote control device 440. The RF signals 406 may be transmitted at a different communication frequency, such as, for example, 2.4 GHz or 5.6 GHz. The RF signals 406 may be transmitted using a different RF protocol, such as, for example, one of WIFI, ZIGBEE, Z-WAVE, KNX-RF, ENOCEAN RADIO protocols, or a different proprietary protocol.

The battery-powered remote control device 450 may include one or more actuators 452 (e.g., one or more of an on button, an off button, a raise button, a lower button, and a preset button). The battery-powered remote control device 450 may transmit RF signals 406 in response to actuations of one or more of the actuators 452. The battery-powered remote control device 450 may be handheld. The battery-powered remote control device 450 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHTLIGHT, the entire disclosures of which are hereby incorporated by reference.

The occupancy sensor 460 may be configured to detect occupancy and vacancy conditions in the space in which the load control system 400 is installed. The occupancy sensor 460 may transmit digital messages to the wall-mounted load control device 410 and/or the plug-in load control device 420 via the RF signals 406 in response to detecting the occupancy or vacancy conditions. The wall-mounted load control device 410 and/or the plug-in load control device 420 may be configured to turn on the respective light bulb 412, 422 in response to receiving an occupied command. The wall-mounted load control device 410 and/or the plug-in load control device 420 may be configured to turn off the respective light bulb in response to receiving a vacant command. The occupancy sensor 460 may operate as a vacancy sensor to turn off (e.g., only turn off) the lighting loads in response to detecting a vacancy condition (e.g., to not turn on the light bulbs 412, 422 in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 470 may be configured to measure a total light intensity in the space in which the load control system is installed. The daylight sensor 470 may transmit digital messages including the measured light intensity to the wall-mounted load control device 410 and/or the plug-in load control device 420. The daylight sensor 470 may transmit digital messages via the RF signals 406 for controlling the intensities of the respective light bulbs 412, 422 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

Digital messages transmitted by the input devices (e.g., the wall-mounted remote control device 440, the battery-powered remote control device 450, the occupancy sensor 460, and the daylight sensor 470) may include a command and identifying information, for example, a serial number (e.g., a unique identifier) associated with the transmitting input device. Each of the input devices may be assigned to the wall-mounted load control device 410 and/or the plug-in load control device 420 during a configuration procedure of the load control system 400, such that the wall-mounted load control device 410 and/or the plug-in load control device 420 are responsive to digital messages transmitted by the input devices via the RF signals 406. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The load control system 400 may include a gateway device 480 (e.g., a bridge) configured to enable communication with a network 482, e.g., a wireless or wired local area network (LAN). The gateway device 480 may be connected to a router (not shown) via a wired digital communication link 484 (e.g., an Ethernet communication link). The router may allow for communication with the network 482, e.g., for access to the Internet. The gateway device 480 may be wirelessly connected to the network 482, e.g., using Wi-Fi technology.

The gateway device 480 may be configured to transmit RF signals 406 to the wall-mounted load control device 410 and/or the plug-in load control device 420 (e.g., using the proprietary protocol) for controlling the respective light bulbs 412, 422 in response to digital messages received from external devices via the network 482. The gateway device 480 may be configured to receive RF signals 406 from the wall-mounted load control device 410, the plug-in load control device 420, the motorized window treatment 430, the wall-mounted remote control device 440, the battery-powered remote control device 450, the occupancy sensor 460, and/or the daylight sensor 470 (e.g., using the proprietary protocol). The gateway device 480 may be configured to transmit digital messages via the network 482 for providing data (e.g., status information) to external devices. The gateway device 480 may operate as a central controller for the load control system 400, or may simply relay digital messages between the control devices of the load control system and the network 482.

The load control system 400 may include a network device 490, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a Wi-Fi or wireless-communication-capable television, or any other suitable Internet-Protocol-enabled device. The network device 490 may be operable to transmit digital messages in one or more Internet Protocol packets to the gateway device 480 via RF signals 408 either directly or via the network 482. For example, the network device 490 may transmit the RF signals 408 to the gateway device 480 via a Wi-Fi communication link, a Wi-MAX communications link, a Bluetooth® communications link, a near field communication (NFC) link, a cellular communications link, a television white space (TVWS) communication link, or any combination thereof. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 490 may include a visual display 492. The visual display 492 may include a touch screen that may include, for example, a capacitive touch pad displaced overtop the visual display, such that the visual display may display soft buttons that may be actuated by a user. The network device 490 may include a plurality of hard buttons, e.g., physical buttons (not shown), in addition to the visual display 492. The network device 490 may download a product control application for allowing a user of the network device to control the load control system 400. In response to actuations of the displayed soft buttons or hard buttons, the network device 490 may transmit digital messages to the gateway device 480 through the wireless communications described herein. The network device 490 may transmit digital messages to the gateway device 480 via the RF signals 408 for controlling the wall-mounted load control device 410 and/or the plug-in load control device 420. The gateway device 480 may be configured to transmit RF signals 408 to the network device 490 in response to digital messages received from the wall-mounted load control device 410, the plug-in load control device 420, the motorized window treatment 430, the wall-mounted remote control device 440, the battery-powered remote control device 450, the occupancy sensor 460, and/or the daylight sensor 470 (e.g., using the proprietary protocol) for displaying data (e.g., status information) on the visual display 492 of the network device.

The operation of the load control system 400 may be programmed and configured using the gateway device 480 and/or network device 490. An example of a configuration procedure for a wireless load control system is described in greater detail in commonly-assigned U.S. patent application Ser. No. 13/830,237, filed Mar. 14, 2013, entitled COMMISSIONING LOAD CONTROL SYSTEMS, the entire disclosure of which is hereby incorporated by reference.

When the load control system 400 is being installed and/or configured, the wall-mounted load control device 410 may be installed without a faceplate. When no faceplate is installed, the wall-mounted load control device 410 may be characterized by a first communication range $R_1$ at the communication frequency $f_{RF}$. When an appropriate faceplate (e.g., the conductive faceplate 180, 220 or the plastic faceplate 102 having the conductive backer 210, 230) is installed, the wall-mounted load control device 410 may be characterized by a second communication range $R_2$ greater than the first communication range $R_1$. The first communication range $R_1$ may be greater than or equal to a minimum acceptable communication range $R_{MIN}$ (e.g., approximately 30 feet), such that the load control device is able to properly transmit and receive the RF signals if no faceplate is installed while the load control system 400 is being installed and/or configured.

The wall-mounted load control device 400 may include a temporary radiating element (not shown) affixed to a front surface of the bezel (e.g., the bezel 114) for re-tuning the antenna of the control device while the load control system 400 is being installed and/or configured. The temporary radiating element may operate in a similar manner as the conductive backer 210 on the plastic faceplate 102. The temporary radiating element may increase the communication range of the wall-mounted load control device 400 at the communication frequency $f_{RF}$ while the load control system 400 is being installed and/or configured. For example, the temporary radiating element may comprise a label affixed to the front surface of the bezel 114, where the label has an internal conductive element. After the load control system 400 is installed and configured, the temporary radiating element may be removed from the bezel 114 and the appropriate faceplate (e.g., the conductive faceplate 180, the plastic faceplate 102 having the conductive backer 210, or the conductive faceplate 220 having the conductive backer 230) may be installed on the wall-mounted load control device 400.

Examples of wireless load control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS; and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of all of which are hereby incorporated by reference.

What is claimed is:

1. A load control device for controlling power delivered from an AC power source to an electrical load, the load control device comprising:
   a controllably conductive device adapted to be electrically coupled between the AC power source and the electrical load;
   a user interface configured to receive a user input;
   a conductive faceplate defining an opening for receiving the user interface;
   an antenna configured to communicate radio-frequency signals;
   a radio-frequency communication circuit configured to communicate the radio-frequency signals via the antenna; and
   a control circuit responsive to the user input and the radio-frequency communication circuit, the control circuit configured to control the controllably conductive device to control the power delivered to the electrical load; and
   wherein the conductive faceplate is configured to operate as a radiating element of the antenna when the conductive faceplate is mounted to the control device and the user interface is received in the opening of the conductive faceplate.

2. The load control device of claim 1, further comprising:
   a yoke configured to mount the load control device to an electrical wallbox; and
   a bezel attached to the yoke, the bezel configured to provide the user interface through the opening of the conductive faceplate;
   wherein the antenna comprises a driven element located between the bezel and the yoke and capacitively coupled to the conductive faceplate.

3. The load control device of claim 2, wherein the conductive faceplate comprises a conductive material arranged over a plastic carrier.

4. The load control device of claim 3, wherein the conductive faceplate comprises a conductive backer that is attached to a rear surface of the plastic carrier and is electrically coupled to the yoke via a single electrical connection when the conductive faceplate is mounted to the load control device.

5. The load control device of claim 2, wherein the conductive faceplate is electrically coupled to the yoke via a single electrical connection when the conductive faceplate is mounted to the load control device, the conductive faceplate configured to operate as a patch antenna when the conductive faceplate is electrically coupled to the yoke via the single electrical connection.

6. The load control device of claim 1, wherein the antenna comprises a slot antenna.

7. The load control device of claim 6, wherein the conductive faceplate defines an elongated opening for receiving the user interface, and the slot antenna comprises a driven element capacitively coupled to the conductive faceplate, the driven element defining a slot that is substantially the same size as and substantially aligned with the opening of the conductive faceplate when the conductive faceplate is mounted to the load control device and the user interface is received in the opening of the conductive faceplate.

8. The load control device of claim 7, wherein the radio-frequency communication circuit is directly electrically coupled to the conductive faceplate via two drive points located on opposite sides of the elongated opening at approximately the middle of the elongated opening when the conductive faceplate is mounted to the load control device.

9. The load control device of claim 1, wherein the radio-frequency communication circuit is configured to be directly electrically connected to the conductive faceplate when the conductive faceplate is mounted to the load control device.

10. The load control device of claim 1, wherein the conductive faceplate is made entirely of metal.

11. A control device, comprising:
   a yoke configured to mount the control device to an electrical wallbox;
   a front surface anterior to the yoke;
   a user interface provided at the front surface, the user interface configured to receive a user input;
   an antenna having a driven element located between the front surface and the yoke;
   a radio-frequency communication circuit electrically coupled to the driven element of the antenna and configured to communicate radio-frequency signals via the antenna; and
   a control circuit configured to be responsive to the radio-frequency communication circuit and the user input received by the user interface;

wherein the front surface comprises a conductive material that covers 85% or more of the front surface and is capacitively coupled to the driven element of the antenna.

12. The control device of claim 11, wherein the front surface is a faceplate.

13. The control device of claim 12, wherein the faceplate comprises a plastic carrier and the conductive material is arranged over the plastic carrier.

14. The control device of claim 12, wherein the faceplate is a metal faceplate.

15. The control device of claim 11, wherein the front surface has an opening and the user interface protrudes through the opening.

16. The control device of claim 11, wherein the antenna is a slot antenna.

17. The control device of claim 11, wherein the conductive material is configured to operate as a radiating element of the antenna.

18. A wall-mountable multi-gang wireless control system comprising:
a plurality of wireless control devices adapted to be mounted in a multi-gang electrical wallbox, each wireless control devices comprising a respective antenna configured to communicate radio-frequency signals; and
a conductive faceplate configured to be mounted to the wireless control devices, the conductive faceplate comprising a single conductive material that is configured to operate as a radiating element for the respective antenna of each one of the plurality of wireless control devices when the conductive faceplate is mounted to the plurality of wireless control devices.

19. The system of claim 18, wherein each wireless control device comprises a respective yoke configured to mount the wireless control device to the multi-gang electrical wallbox.

20. The system of claim 19, wherein the yoke of at least one of the control devices is coupled to the conductive material via a single electrical connection when the conductive faceplate is mounted to the plurality of wireless control devices.

21. The system of claim 18, wherein each wireless control device comprises a respective user interface configured to receive a user input, the conductive faceplate defining a plurality of openings configured to receive the respective user interface of the wireless control devices when the conductive faceplate is mounted to the plurality of wireless control devices.

* * * * *